(12) United States Patent
Matsuoka et al.

(10) Patent No.: US 8,951,706 B2
(45) Date of Patent: Feb. 10, 2015

(54) ELECTROSTATIC IMAGE DEVELOPING TONER, ELECTROSTATIC DEVELOPER, TONER CARTRIDGE, PROCESS CARTRIDGE, IMAGE FORMING APPARATUS, AND IMAGE FORMING METHOD

(71) Applicant: Fuji Xerox Co., Ltd., Tokyo (JP)

(72) Inventors: Hirotaka Matsuoka, Kanagawa (JP); Sumiaki Yamasaki, Kanagawa (JP); Satoshi Hiraoka, Kanagawa (JP); Yuki Sasaki, Kanagawa (JP); Susumu Yoshino, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 13/626,645

(22) Filed: Sep. 25, 2012

(65) Prior Publication Data
US 2013/0029264 A1    Jan. 31, 2013

Related U.S. Application Data

(63) Continuation-in-part of application No. 13/296,494, filed on Nov. 15, 2011.

(30) Foreign Application Priority Data

Apr. 15, 2011 (JP) .................................. 2011-091570
Apr. 16, 2012 (JP) .................................. 2012-093429

(51) Int. Cl.
*G03G 9/087* (2006.01)
*C08G 63/672* (2006.01)
*G03G 9/097* (2006.01)

(52) U.S. Cl.
CPC .......... *C08G 63/672* (2013.01); *G03G 9/08755* (2013.01); *G03G 9/08775* (2013.01); *G03G 9/08795* (2013.01); *G03G 9/09725* (2013.01)
USPC ...................... 430/109.4; 430/123.5; 399/252

(58) Field of Classification Search
USPC ............................ 430/109.4, 123.5; 399/252
See application file for complete search history.

(56) References Cited

U.S. PATENT DOCUMENTS

| 2003/0203301 A1 | 10/2003 | Iga |
| 2006/0216627 A1* | 9/2006 | Mizutani et al. ........... 430/109.4 |
| 2009/0156784 A1* | 6/2009 | Kubo et al. .................... 530/211 |
| 2010/0196817 A1* | 8/2010 | Sasaki et al. ............... 430/109.4 |

FOREIGN PATENT DOCUMENTS

| DE | 37 38 777 | * 5/1988 | ............... G03G 9/08 |
| JP | A-60-186866 | 9/1985 | |
| JP | B-02-45188 | 8/1990 | |
| JP | A-2006-292820 | 10/2006 | |
| JP | A-2007-137910 | 6/2007 | |
| JP | B2-4505738 | 7/2010 | |

OTHER PUBLICATIONS

Jul. 2, 2012 Extended European Search Report issued in European Application No. 11 19 0248.2.
U.S. Appl. No. 13/296,494 in the name of Yamasaki et al, filed Nov. 15, 2011.

* cited by examiner

*Primary Examiner* — Peter Vajda
(74) *Attorney, Agent, or Firm* — Oliff PLC

(57) ABSTRACT

An electrostatic image developing toner contains toner particles containing a polyester resin having a repeating unit deriving from a dicarboxylic acid and a repeating unit deriving from a rosin diol, and an external additive containing silica particles, wherein a weight average molecular weight (Mw) of the soluble matter in tetrahydrofuran of the toner is from about 60,000 to about 200,000.

9 Claims, 2 Drawing Sheets

ELECTROSTATIC IMAGE DEVELOPING TONER, ELECTROSTATIC DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This is a Continuation-In-Part application of U.S. application Ser. No. 13/296,494 filed in the United States on Nov. 15, 2011; the entire content of which is hereby incorporated by reference.

Further, this application is based on and claims priority under 35 USC 119 from Japanese Patent Application No. 2012-93429 filed on Apr. 16, 2012.

BACKGROUND

1. Field

The present invention relates to an electrostatic image developing toner, an electrostatic developer, a toner cartridge, a process cartridge, an image forming apparatus, and an image forming method.

2. Description of the Related Art

There is disclosed in JP-α-02-45188 (The term "JP-B" as used herein refers to an "examined Japanese patent publication".) a developing method of arranging an electrostatic image holding member holding an electrostatic image on the surface thereof and a developer holding member holding an insulating magnetic developer on the surface thereof with a specific interval in a developing zone to make the insulating magnetic developer carry on the developer holding member in a thickness thinner than the above interval, and transferring the developer to the electrostatic image holding member under the function of the magnetic field to perform development, wherein a developer containing a toner having an average particle size of 5 µm to 30 µm, silica having been subjected to treatment with particles as additive particles having an average primary particle size of 1 mµ to 30 mµ, and an inorganic oxide having an average particle size of 150 mµ, to 5 µm is used as the developer.

There is disclosed in JP-A-60-186866 (The term "JP-A" as used herein refers to an "unexamined published Japanese patent application") a developer containing a carrier, a toner, and particles having an average particle size smaller than the average particle size of the toner, wherein at least one kind of polymer particles selected from a ferrite carrier, a toner having a coloring agent dispersed in a polyester resin, an acryl polymer, an acryl/styrene polymer, a polymer or copolymer of a nitrogen-containing addition polymerizable monomer, and a polymer or copolymer of a polymerizable unsaturated carboxylic acid is used.

SUMMARY (1) An electrostatic image developing toner including:
toner particles containing a polyester resin having a repeating unit deriving from a dicarboxylic acid and a repeating unit deriving from a rosin diol, and
an external additive containing silica particles,
wherein a weight average molecular weight (Mw) of the soluble matter in tetrahydrofuran of the toner is from about 60,000 to about 200,000.

BRIEF DESCRIPTION OF THE DRAWINGS

Exemplary embodiments of the present invention will be described in detail based on the following figures, wherein.

DETAILED DESCRIPTION OF EXEMPLARY EMBODIMENTS

Figure 1:
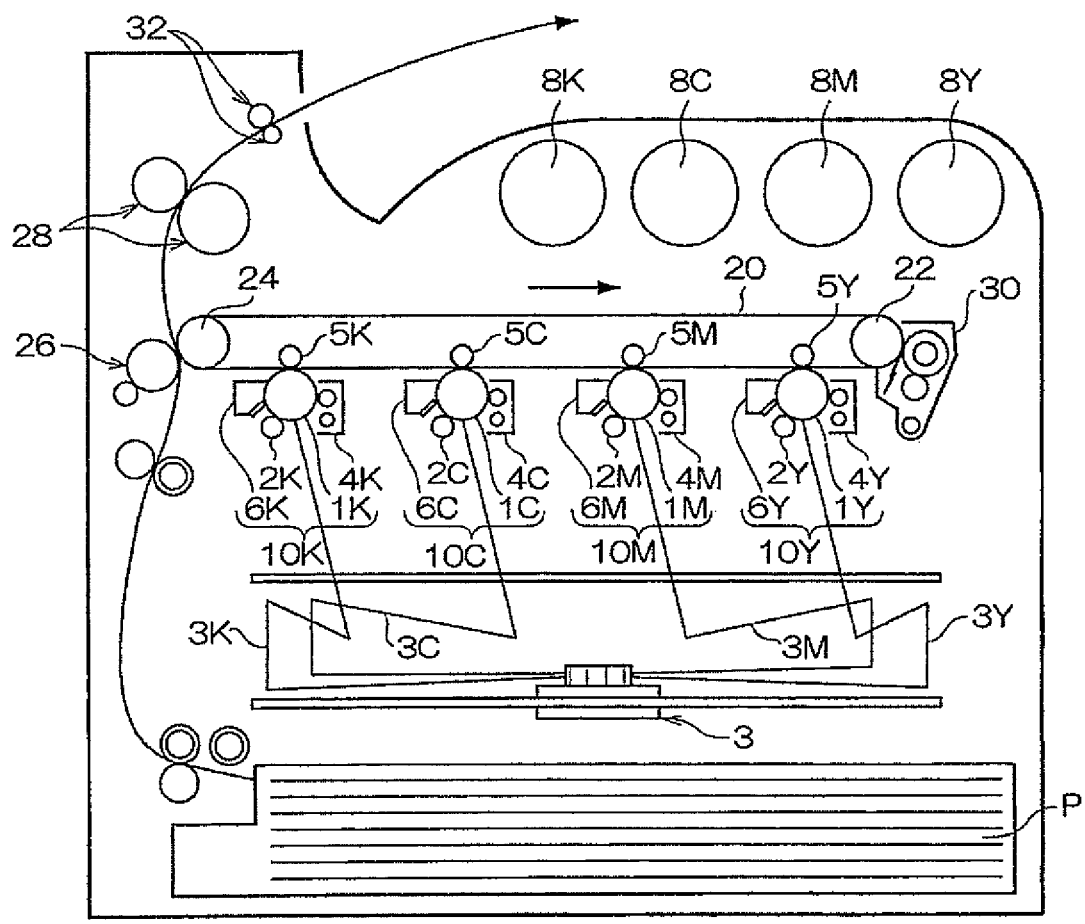
FIG. 1 is a schematic drawing showing an example of an image forming apparatus in the exemplary embodiment.

An exemplary embodiment of the invention will be described in detail below.

[Electrostatic Image Developing Toner]

The electrostatic image developing toner in the exemplary embodiment (hereinafter referred to as simply a toner in some cases) contains toner particles containing a polyester resin having a repeating unit deriving from a dicarboxylic acid and a repeating unit deriving from a rosin diol, and an external additive containing silica particles, and the weight average molecular weight (Mw) of the soluble matter in tetrahydrofuran of the toner is from 60,000 to 200,000 or from about 60,000 to about 200,000.

That is, the toner in the present exemplary embodiment contains in toner particles a polyester resin having a repeating unit deriving from a rosin diol and a polyester resin having a high weight average molecular weight.

By the above constitution, the toner in the exemplary embodiment can restrain liberation of the external additive while maintaining a broad fixing temperature region capable of reconciling a low temperature fixing property and an offset resisting property at a high temperature.

The reasons for this fact are presumed as follows.

In the first place, generation of liberation of the external additive from the toner tend to be restrained by increasing the weight average molecular weight of the resin contained in the toner.

For the reason, the following can be presumed.

For restraining liberation of the external additive of the toner or restraining impaction of the external additive into the toner, it is thought to be necessary to strengthen the attachment of the external additive to the toner.

And by heightening the weight average molecular weight of the toner, impaction of the external additive to the toner surface is restrained. Further, by increasing electrostatic attaching strength of the external additive and the resin contained in the toner particles, the amount of the liberated external additive is reduced.

In particular, in a toner using a polyester resin having a rosin structure, the electrostatic attaching strength is liable to be further heightened and the amount of the liberated external additive shows a tendency to be reduced.

On the other hand, when the weight average molecular weight of the soluble matter in tetrahydrofuran of the toner is heightened, the low temperature fixing property is difficult to be realized, but since the above polyester resin has a repeating unit deriving from a rosin diol, the resin presumably has a characteristic of steeply melting differently from conventional resins.

Accordingly, by the following function on the toner containing the polyester resin in the exemplary embodiment of the present invention, the low temperature fixing property of the toner can be realized even when the weight average molecular weight is high.

Further, the toner in the exemplary embodiment is steeply melted by heating in fixing and fixed on paper. After being fixed, since the weight average molecular weight is high, sufficient image strength can be obtained.

In addition to the above, since the toner in the exemplary embodiment of the invention is high in the weight average molecular weight of the toner and has resistance against hot offset with sufficient viscosity even at a high temperature, offset resistance at a high temperature is realized.

That is, even when the weight average molecular weight of the polyester resin contained in the toner particles in the exemplary embodiment is high, similarly to the case where the weight average molecular weight is low, a low temperature fixing property and an offset resisting property at a high temperature are realized, and so the toner in the exemplary embodiment can maintain a broad fixing temperature region.

From the above, the toner in the exemplary embodiment is restrained in liberation of an external additive while maintaining a broad fixing temperature region capable of reconciling a low temperature fixing property and an offset resisting property at a high temperature.

Further, it is presumed that the toner in the exemplary embodiment can restrain image defects (e.g., blank areas and black peppers), reduction of developing properties, filming of the image holding member (the photoconductor), and carrier contamination (carrier impaction) by restraining the liberation of an external additive.

In the exemplary embodiment of the invention, the rate of external additives liberated from the toner is referred to as the liberation rate of the external additives, to all the external additives being attached to the toner.

The liberation rate of an external additive is generally preferably from 0.01% by mass to 20% by mass or from about 0.01% by mass to about 20% by mass, and more preferably from 0.1% by mass to 10% by mass or from about 0.1% by mass to about 10% by mass.

The liberation rate of external additives is found as to every kind of additive, and when silica particles or silica particles and other particles are used as external additives, it is preferred that the liberation rate of at least silica particles falls within the above range.

In addition, when particles other than silica particles are applied as the external additives, it is preferred that the liberation rates of all the particles are in the above range.

The liberation rate of an external additive is found as follows.

In the first place, 100 mL of ion exchange water and 5.5 mL of a 10% by mass Toriton X100 aqueous solution (manufactured by Acros Organics) are put in a glass bottle having a capacity of 200 mL, 5 g of a toner is added to the above mixed solution, stirred for 30 times, and the solution is allowed to stand for 1 hour or more.

After that, the above mixed solution is stirred 20 times, and the dial of an ultrasonic wave homogenizer (homogenizer VCX750, CV33, manufactured by SONICS & MATERI-ALS) is set at the output of 30%, and ultrasonic wave energy is applied for 1 minute on the following condition.

Vibration time: Continuously 60 seconds
Amplitude: Set at 20 W (30%)
Temperature at the time of starting of vibration: 23° C.±1.5° C.
Distance between the ultrasonic vibrator and the bottom of the bottle: 10 mm In the next place, the mixed solution applied with ultrasonic wave energy is subjected to suction filtration with a filter paper [qualitative filter paper (trade name: No. 2, 110 mm), manufactured by Advantec Toyo Kaisha, Ltd.], washed again with ion exchange water two times, and the toner is dried after removing the liberated external additive by filtration.

The amount of the external additive remaining in the toner after removal of the external additive according to the above treatment (hereinafter referred to as the amount of the external additive after dispersion) and the amount of the external additive in the toner not subjected to the treatment of removing the external additive (hereinafter referred to as the amount of the external additive before dispersion) are determined by the fluorescent X-ray method, and the values of the amount of the external additive before dispersion and the amount of the external additive after dispersion are substituted in the following expression.

The value computed by the following expression is taken as the liberation rate of the external additive.

Liberation rate of external additive(%)=[(amount of external additive before dispersion)−(amount of external additive after dispersion)/amount of external additive before dispersion]×100 <Expression>

The toner according to the exemplary embodiment will be described in detail below.

The toner in the exemplary embodiment contains toner particles containing a polyester resin having a repeating unit deriving from a dicarboxylic acid and a repeating unit deriving from a rosin diol, and an external additive, and the polyester resin has a weight average molecular weight (Mw) of the soluble matter in tetrahydrofuran of from 60,000 to 200,000, or from about 60,000 to about 200,000, and the external additive has the liberation rate of the external additive of preferably from 0.1% by mass to 10% by mass or from about 0.1% by mass to about 10% by mass.

Toner particles are explained in the first place.

<Toner Particles>

Toner particles is constituted by containing a binder resin and, if necessary, a coloring agent, a release agent and other additives.

(Binder Resin)

As the binder resin, a polyester resin having a repeating unit deriving from a dicarboxylic acid and a repeating unit deriving from a rosin diol (hereinafter sometimes referred to as specific polyester resin) is exemplified.

The softening temperature of the specific polyester resin is preferably from 80° C. to 160° C. or from about 80° C. to about 160° C. and more preferably from 90° C. to 150° C. or from about 90° C. to about 150° C., from the point of fixing property, storage stability and durability of the toner. The glass transition temperature of the specific polyester resin in the exemplary embodiment is preferably from 35° C. to 80° C. and more preferably from 40° C. to 70° C., from the point of fixing property, storage stability and durability. The softening temperature and the glass transition temperature can be easily regulated by the adjustment of the compositions of the material monomers, polymerization initiators, molecular weights and the amounts of catalysts, or by the selection of the reaction conditions.

<Measurement of Softening Temperature Measurement>

A sample (1 cm$^3$) is melt and is allowed to flow out using a flow tester (CFT-500, manufactured by Shimadzu Corporation) under the following conditions: dice pore diameter=0.5 mm, pressure load=0.98 MPa (10 Kg/cm$^2$), heating rate=1° C./min. A temperature corresponding to a half of the height between the starting temperature and the end temperature of the outflow is defined as the softening temperature.

The glass transition temperature is measured using DSC-20 (manufactured by SEICO Electronics industrial Co., Ltd.) while heating 10 mg of a sample at a constant rate of 10° C./min.

The acid value of the specific polyester resin is generally from 3 mg KOH/g to 30 mg KOH/g from the viewpoint of the electrostatic properties of the toner, and is preferably from 9 mg KOH/g to 21 mg KOH/g. When the acid value is higher than 30 mg KOH/g, the toner is liable to contain water and the electrostatic properties is deteriorated particularly in summer, while when the acid value is lower than 3 mg KOH/g, sometimes the electrostatic properties is conspicuously degraded.

The specific polyester resin contains a rosin ester group and the rosin ester group is a hydrophobic and bulky group. Further, since the air interface of toners generally shows hydrophobicity, the rosin ester group is liable to be exposed on the surface of the toner containing the specific ester resin of the exemplary embodiment of the invention. However, when a large amount of the rosin ester groups are exposed on the surface of the toner, there are cases where the electrostatic properties of the toner deteriorates. In the exemplary embodiment, the quantity of charge of the toner is desirably adjusted by making the acid value of the specific polyester resin in the range of 3 mg KOH/g or more and 30 mg KOH/g or less.

The acid value is measured by neutralization titration in accordance with JIS K0070. Specifically, 100 ml of a mixed solvent of diethyl ether and ethanol and drops of phenolphthalein as an indicator are added to an appropriate amount of a sample and the resulting mixture is sufficiently stirred in a water bath until the sample is completely dissolved. The solution is titrated with a 0.1 mol/l ethanolic solution of potassium hydroxide. The time when pale red of the indicator is observed for 30 sec is defined as the endpoint. The acid value A is calculated by $A=(B \times f \times 5.611)/S$ where S is the sample amount (g), B is the volume (ml) of the 0.1 mol/l ethanolic solution of potassium hydroxide, and f is the factor of the 0.1 mol/l ethanolic solution of potassium hydroxide.

—Composition of Specific Polyester Resin—

The specific polyester resin has a repeating unit deriving from a dicarboxylic acid and a repeating unit deriving from a rosin diol, which is specifically constituted of a polycondensation product of, e.g., a carboxylic acid component containing a dicarboxylic acid and an alcohol component containing a rosin dial.

An example of the synthetic scheme of the specific polyester resin is shown below.

In the following synthetic scheme, a difunctional epoxy compound is reacted with a rosin to synthesize a rosin diol, and the rosin diol is subjected to dehydration polycondensation with a dicarboxylic acid to thereby synthesize the specific polyester resin. In the structural formula representing the specific polyester resin, the portion surrounded by the dashed line corresponds to the rosin ester group.

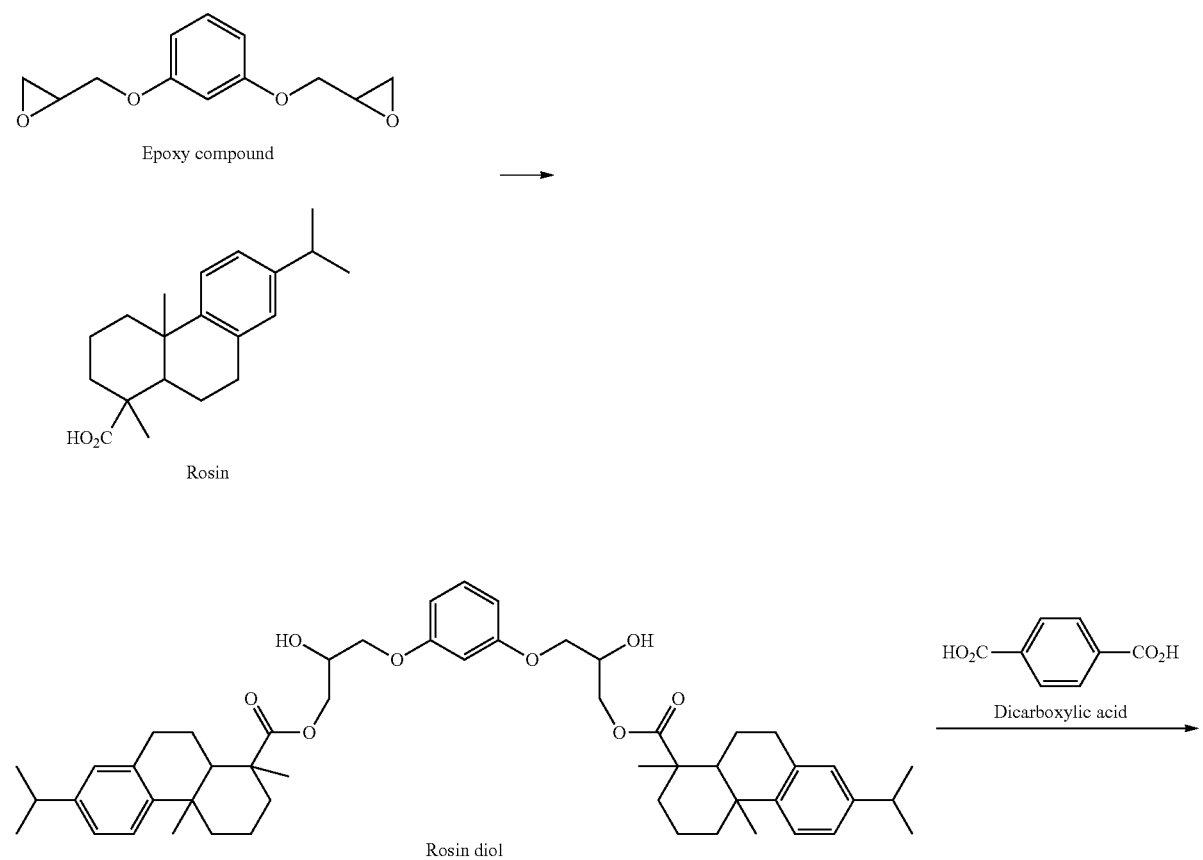

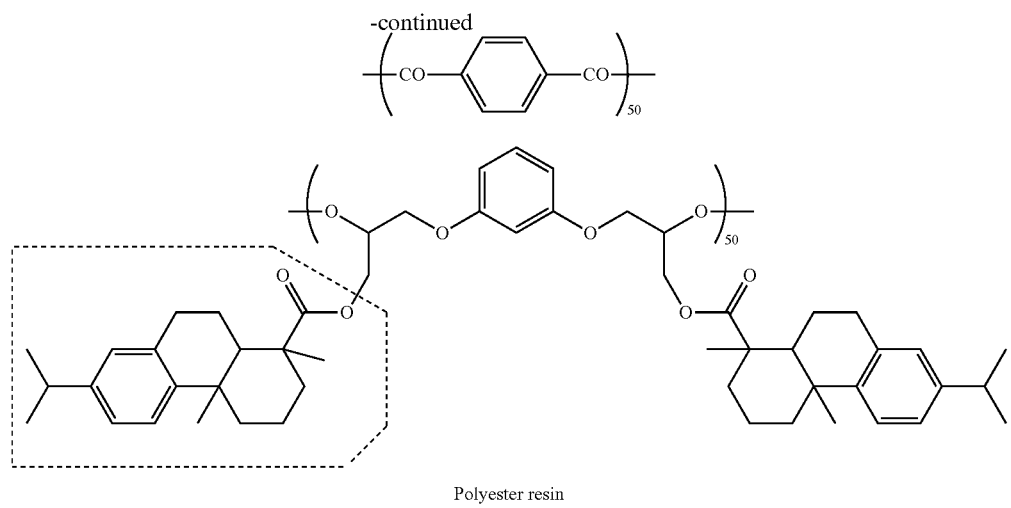

Polyester resin

Incidentally, hydrolysis of the specific polyester resin results in the following monomers. Since the polyester resin is a condensation product of 1/1 of a carboxylic acid component containing a dicarboxylic acid and an alcohol component containing a dialcohol, the constituent components of the resin may be estimated from the decomposed products.

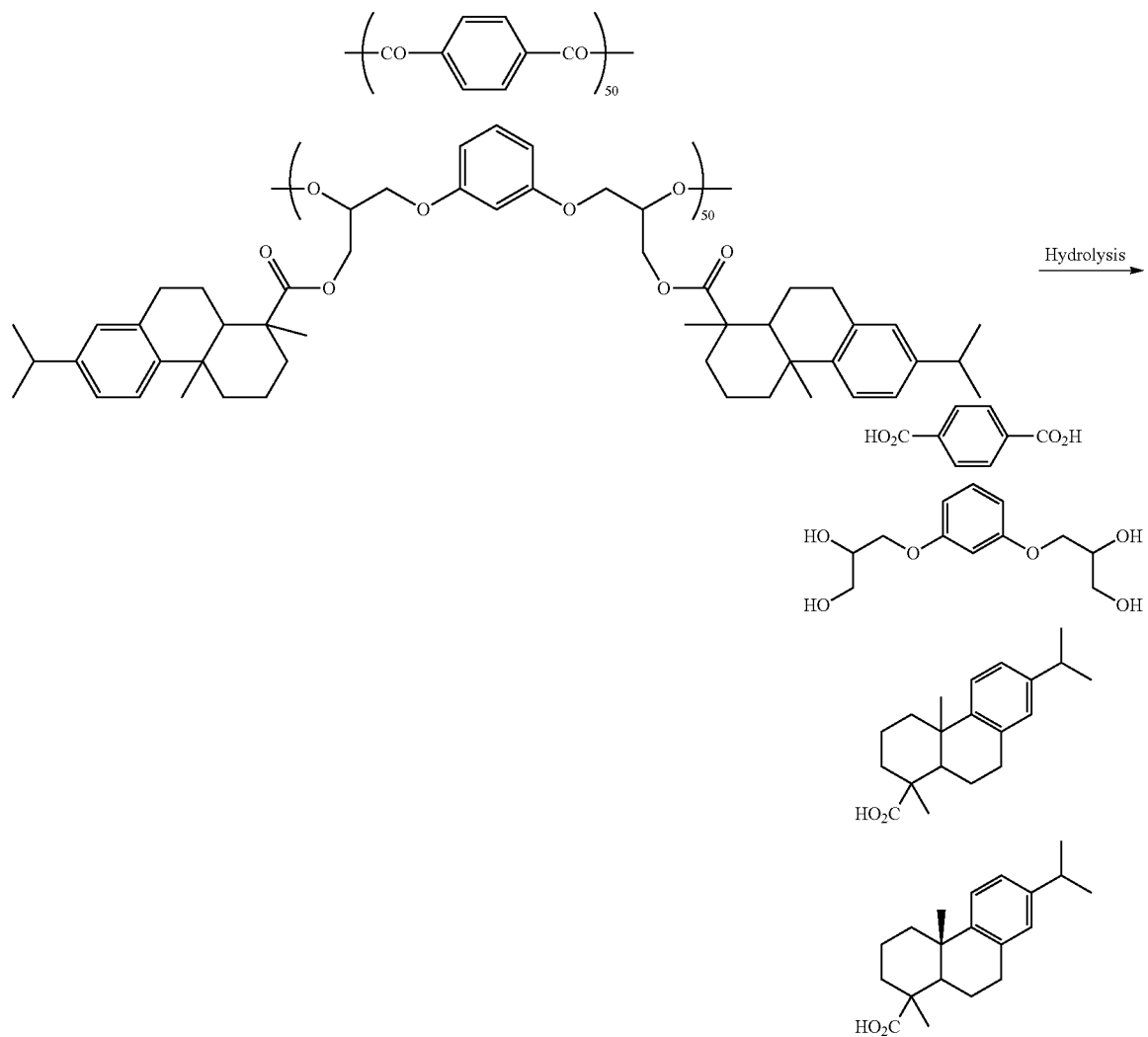

—Alcohol Component—

The alcohol component which is a polycondensation component of the specific polyester resin contains a rosin diol.

The rosin diol is a dialcohol having a rosin ester group and, for example, a rosin diol represented by the following Formula (I) is exemplified as an example:

Formula (1)

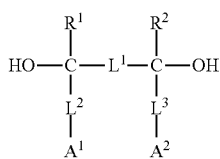

(1)

wherein, each of $R^1$ and $R^2$ independently represents a hydrogen atom or a methyl group; each of $L^1$, $L^2$ and $L^3$ independently represents a divalent linking group selected from the group consisting of carbonyl groups, ester groups, ether groups, sulfonyl groups, chained alkylene groups which may be substituted or unsubstituted, cyclic alkylene groups which may be substituted or unsubstituted, arylene groups which may be substituted or unsubstituted, and combinations thereof, $L^1$ and $L^2$ or $L^1$ and $L^3$ may form a ring; and each of $A^1$ and $A^2$ independently represents a rosin ester group.

In Formula (1), each of $L^1$, $L^2$ and $L^3$ independently represents a divalent linking group selected from the group consisting of carbonyl groups, ester groups, ether groups, sulfonyl groups, chained alkylene groups which may be substituted or unsubstituted, cyclic alkylene groups which may be substituted or unsubstituted, arylene groups which may be substituted or unsubstituted, and combinations thereof, and $L^1$ and $L^2$ or $L^1$ and $L^3$ may form a ring.

The chained alkylene group represented by $L^1$, $L^2$ and $L^3$ may be, for example, $C_1$-$C_{10}$ alkylene groups.

The cyclic alkylene group represented by $L^1$, $L^2$ and $L^3$ may be, for example, $C_3$-$C_7$ cyclic alkylene groups.

The arylene group represented by $L^1$, $L^2$ and $L^3$ may be, for example, phenylene, naphthylene and anthracene groups.

Examples of substituents of the chained alkylene groups, the cyclic alkylene groups and the arylene groups include $C_1$-$C_8$ alkyl groups and aryl groups. A linear, branched or cyclic alkyl group is preferred. Specific examples of such alkyl groups include methyl, ethyl, propyl, butyl, pentyl, hexyl, heptyl, octyl, isopropyl, isobutyl, s-butyl, t-butyl, isopentyl, neopentyl, 1-methylbutyl, isohexyl, 2-ethylhexyl, 2-methylhexyl, cyclopentyl, cyclohexyl and phenyl groups.

Exemplary compounds of rosin diols suitable for use in the present exemplary embodiment are shown below, but the exemplary embodiment is not limited thereto.

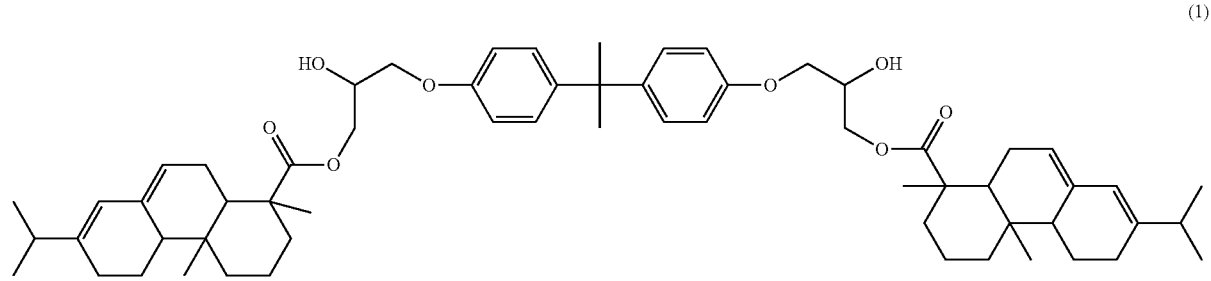

(1)

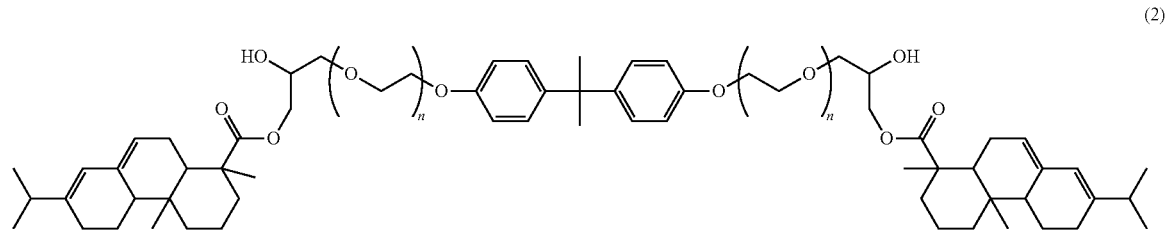

(2)

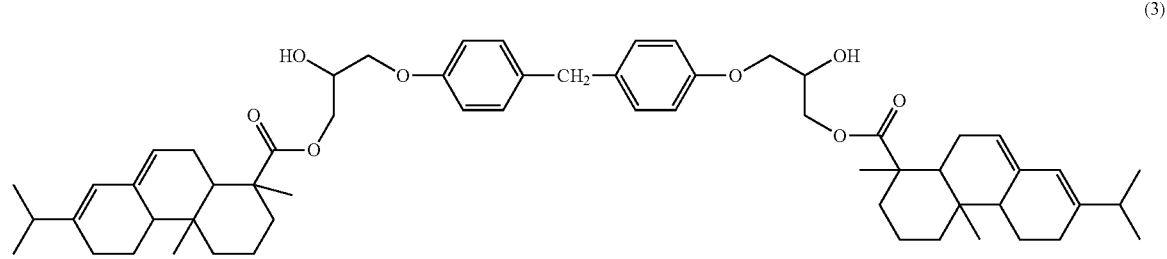

(3)

-continued
(4)
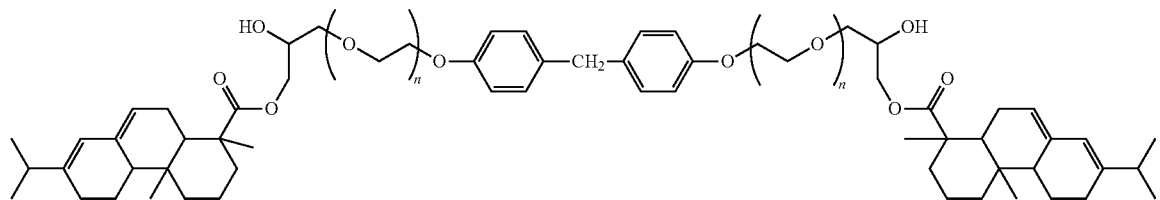
(5)
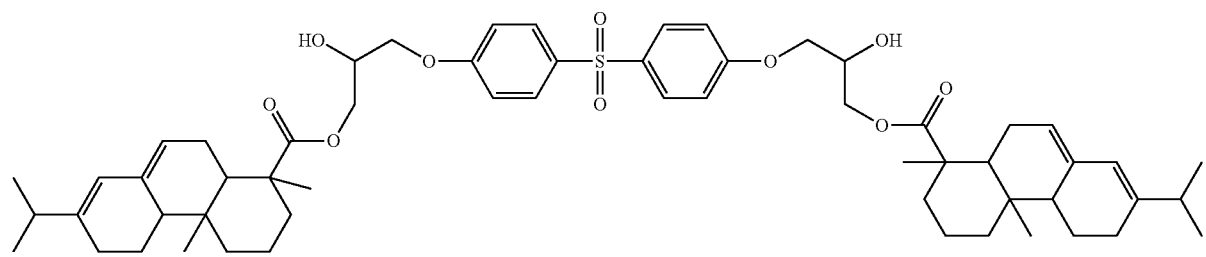
(6)
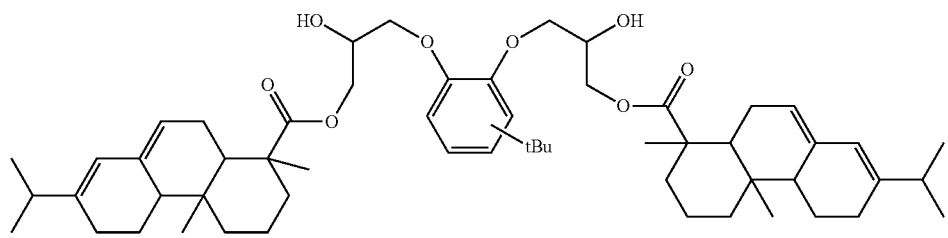
(7)
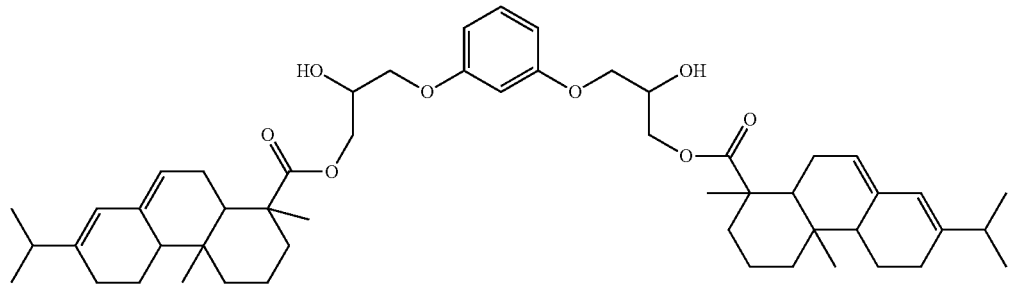
(8)
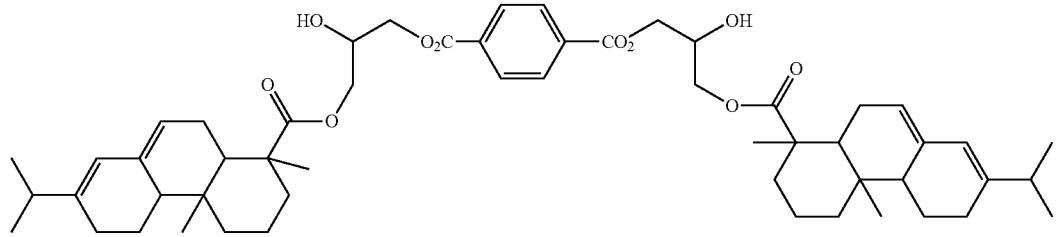
(9)
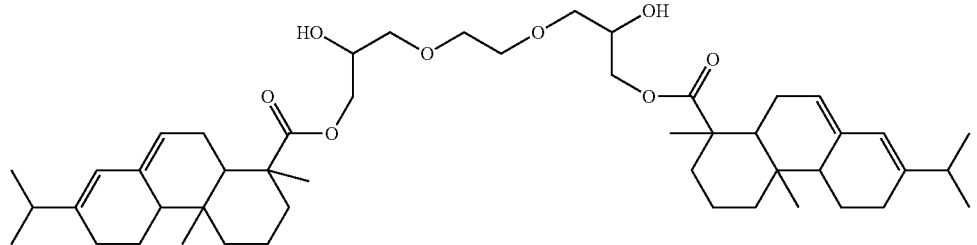

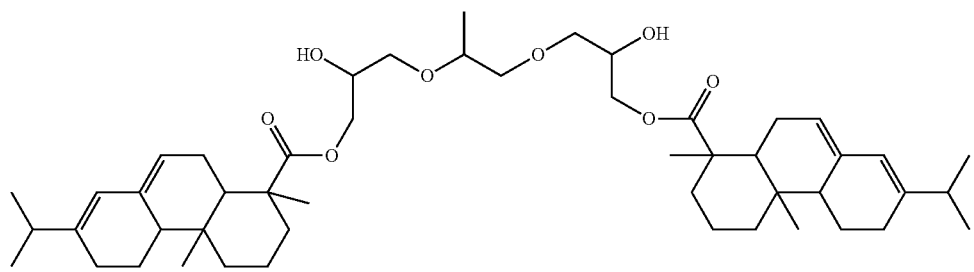
(10)
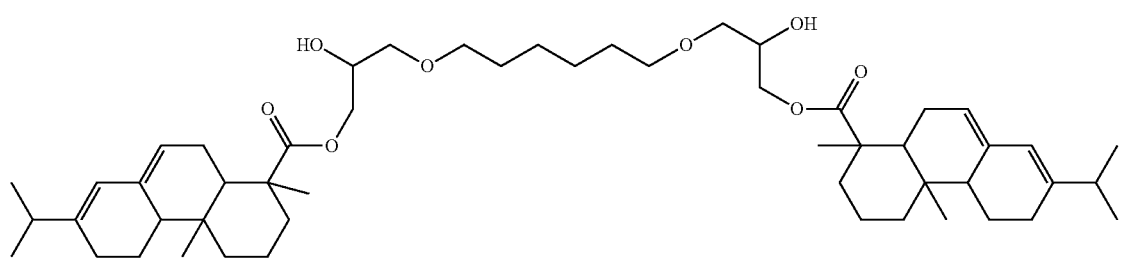
(12)
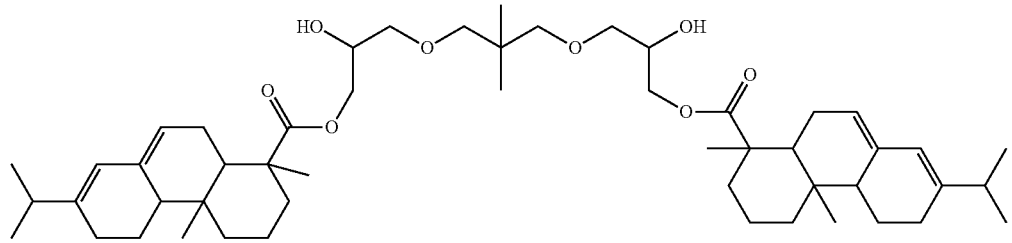
(13)
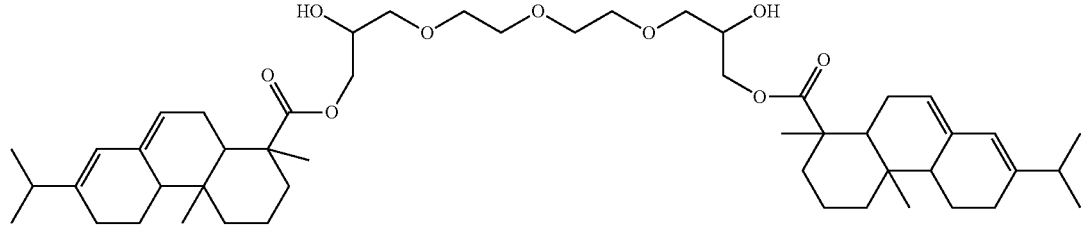
(14)
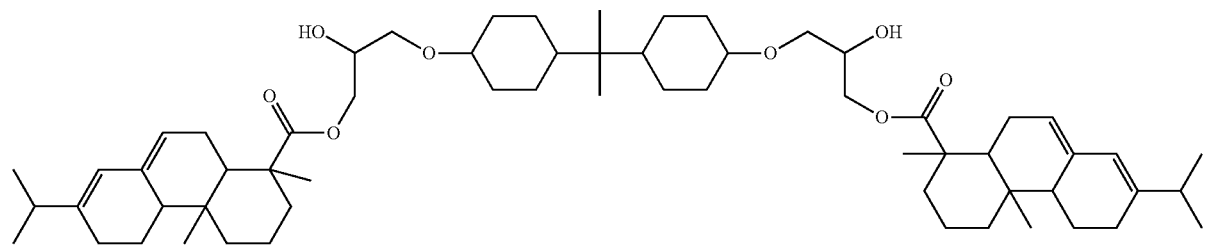
(15)
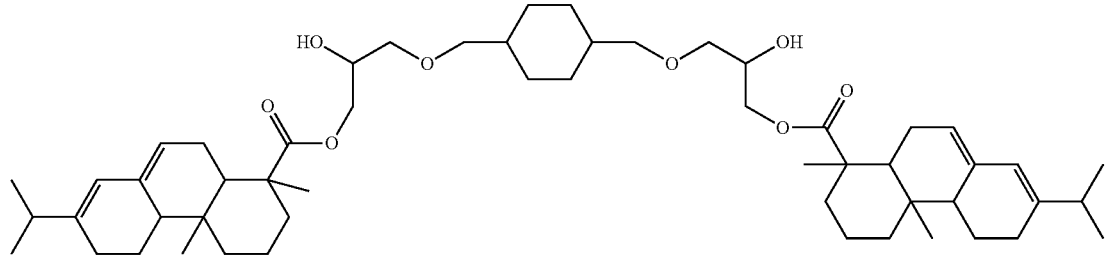
(16)

(17)
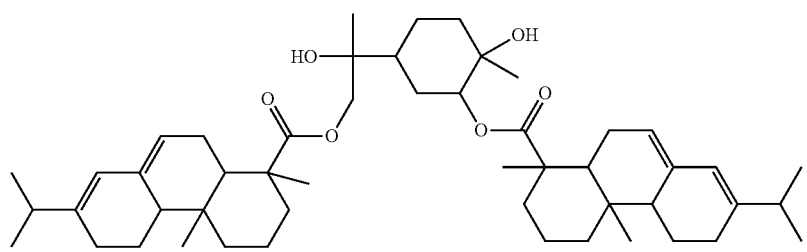
(18)
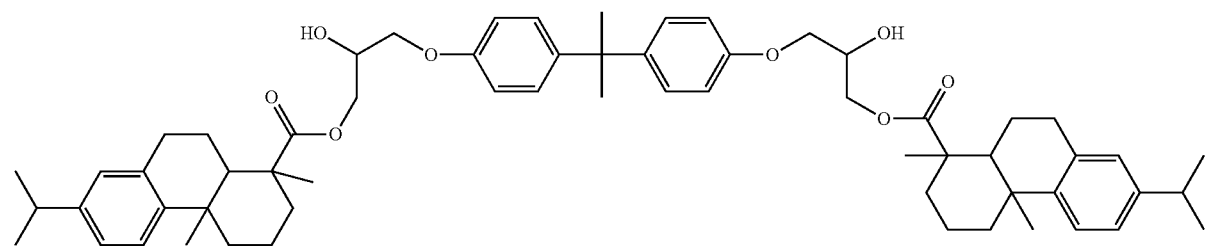
(19)
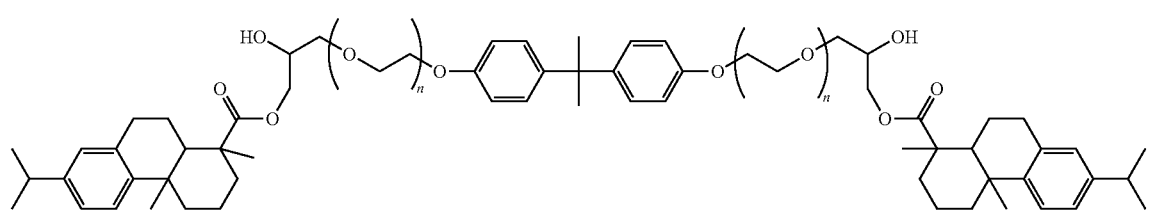
(20)
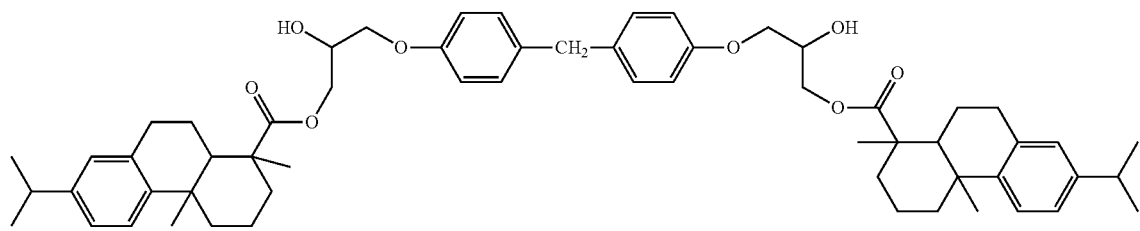
(21)
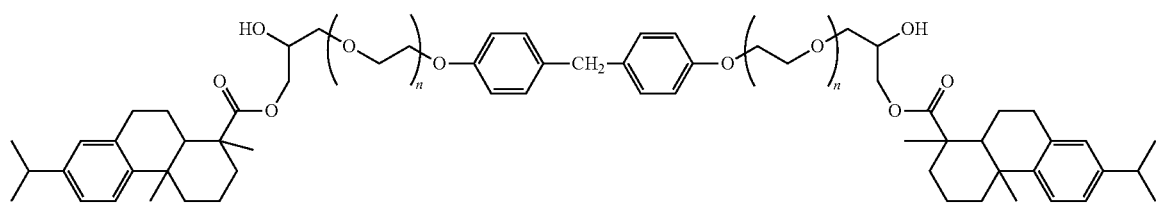
(22)
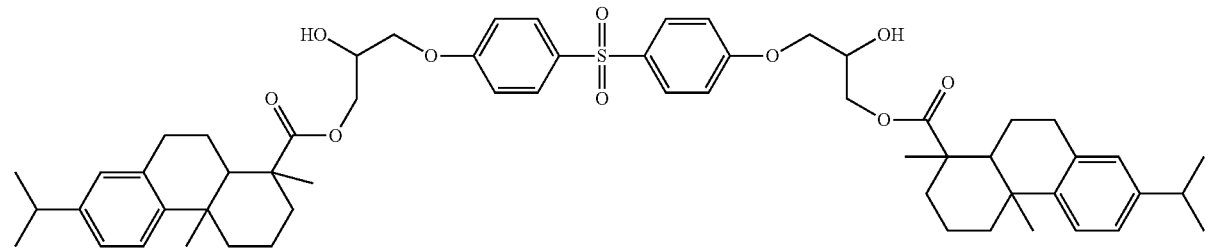

-continued
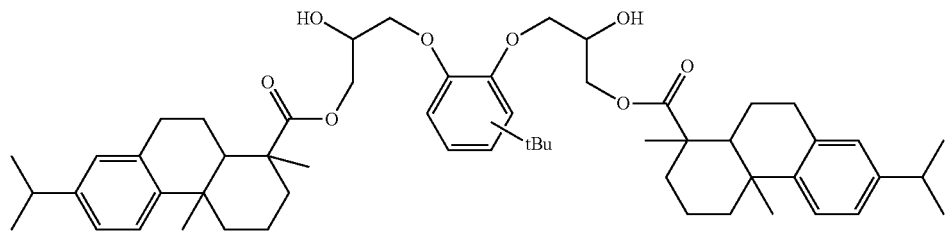
(23)
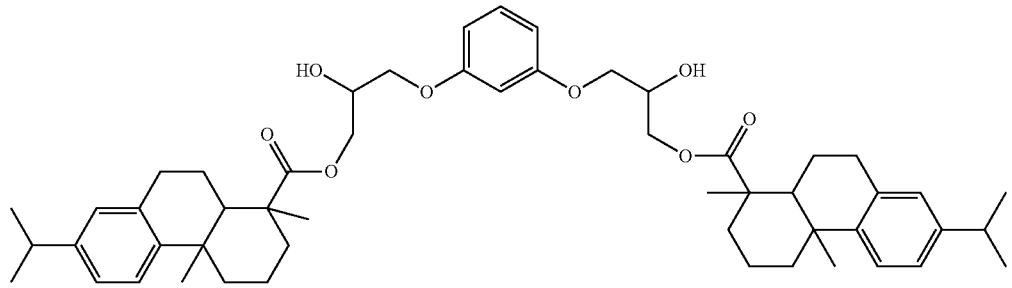
(24)
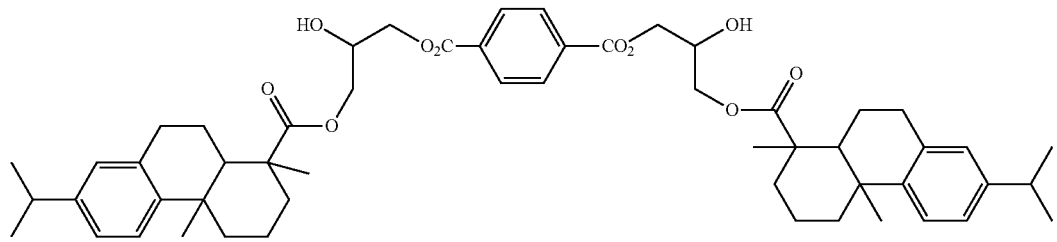
(25)
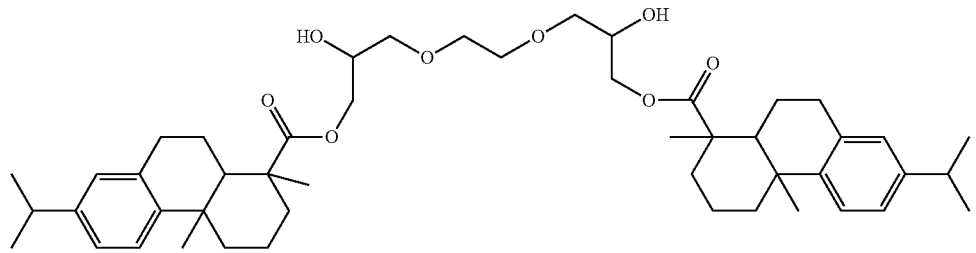
(26)
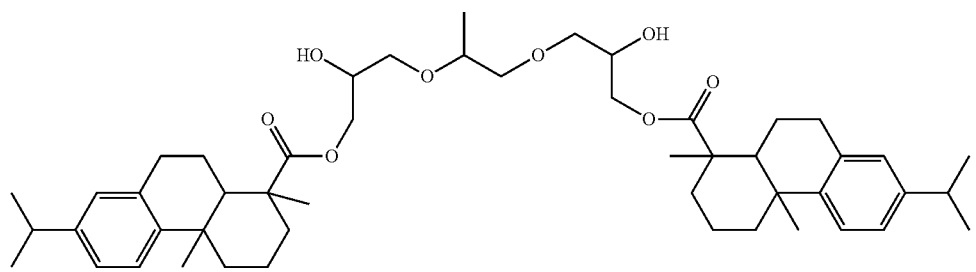
(27)
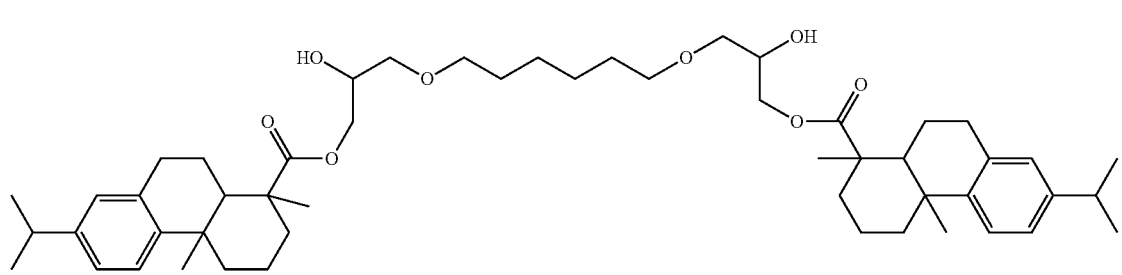
(28)

-continued
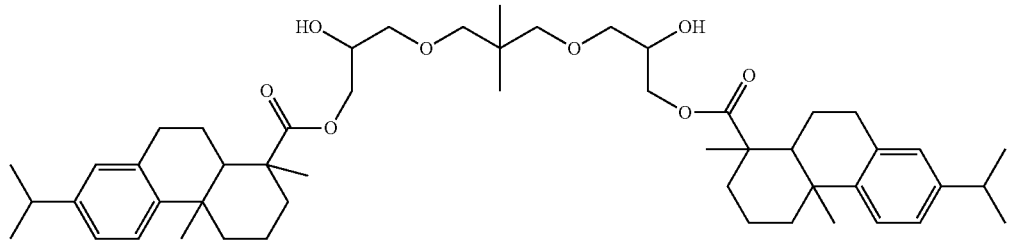
(29)
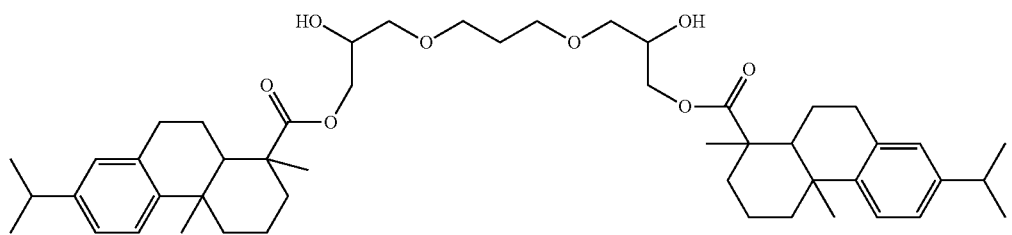
(30)
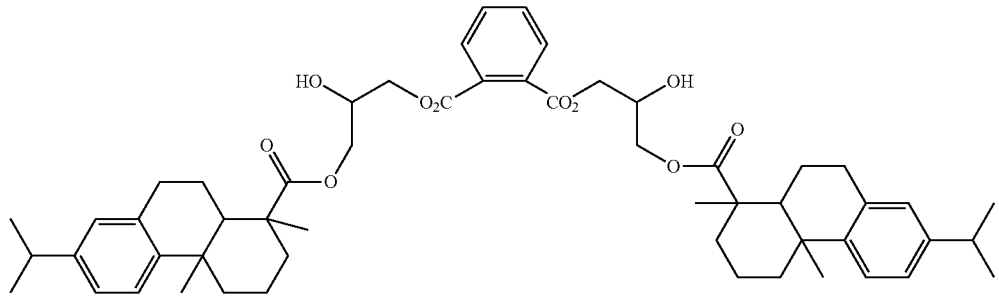
(31)
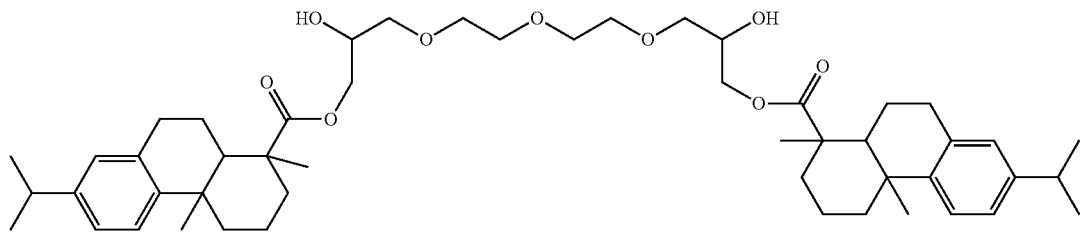
(32)
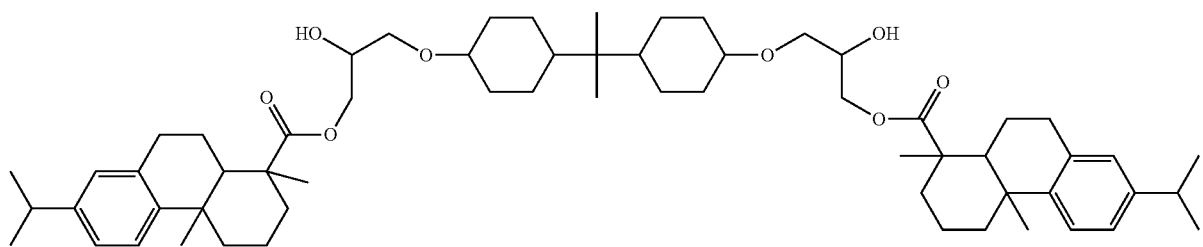
(33)
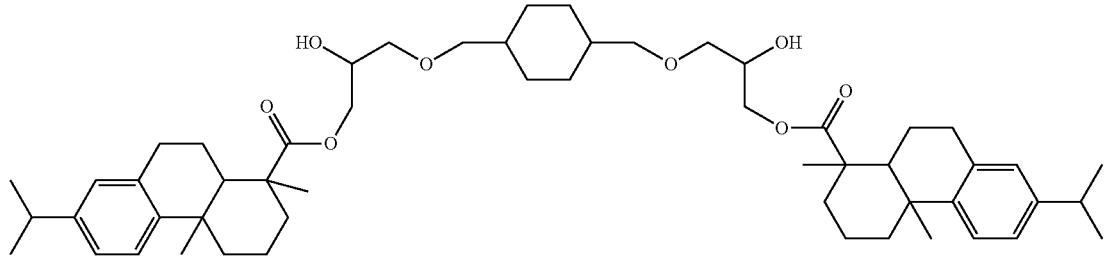
(34)

-continued
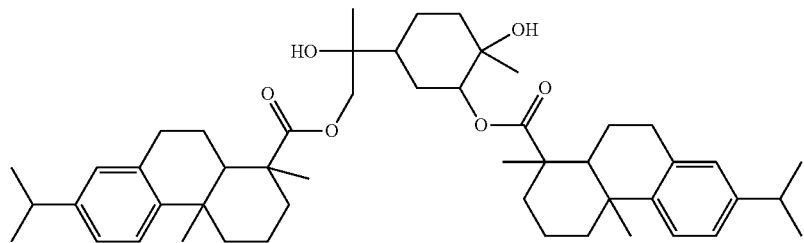
(35)
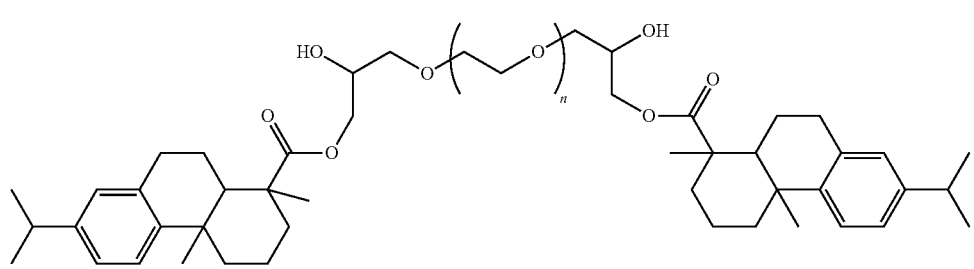
(36)
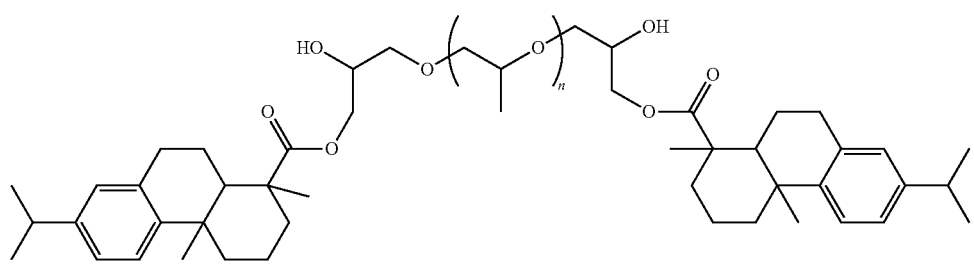
(37)
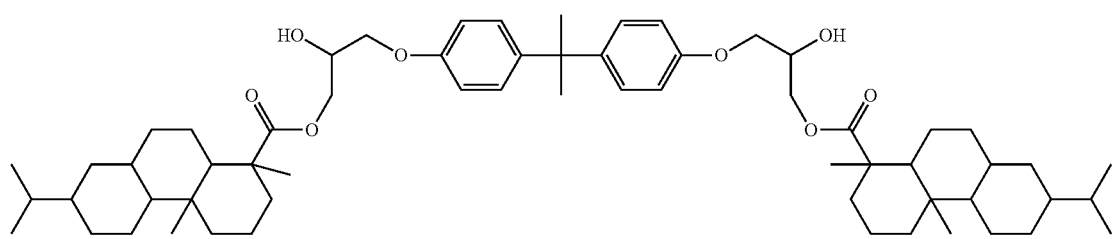
(38)
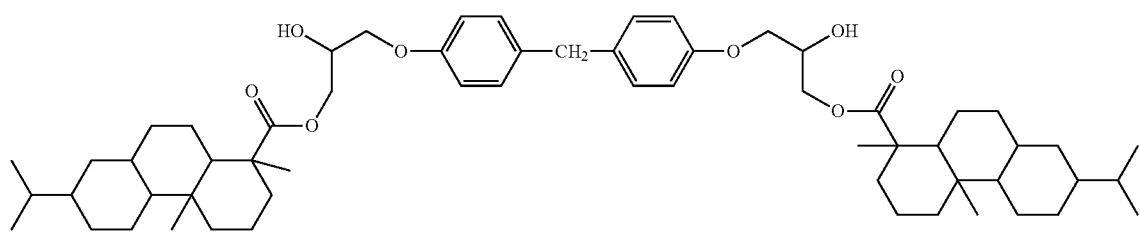
(39)
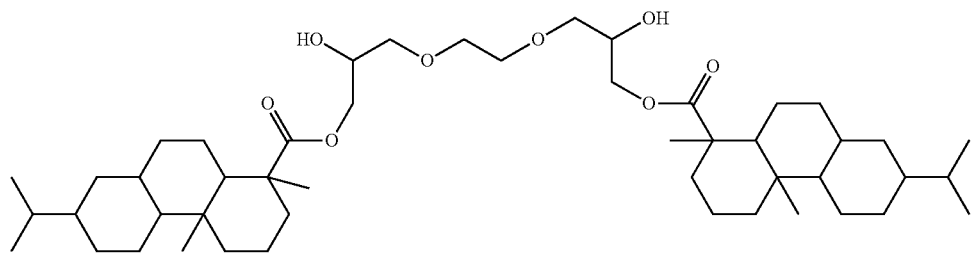
(40)

-continued

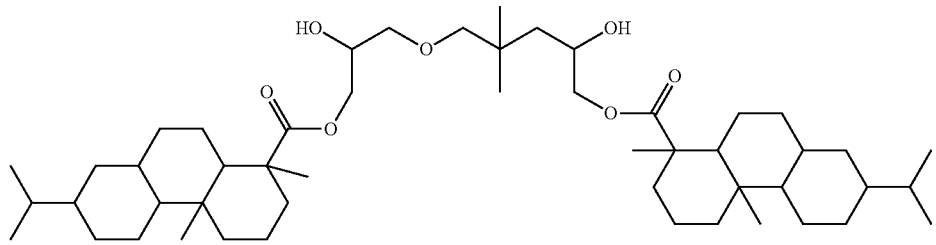

(41)

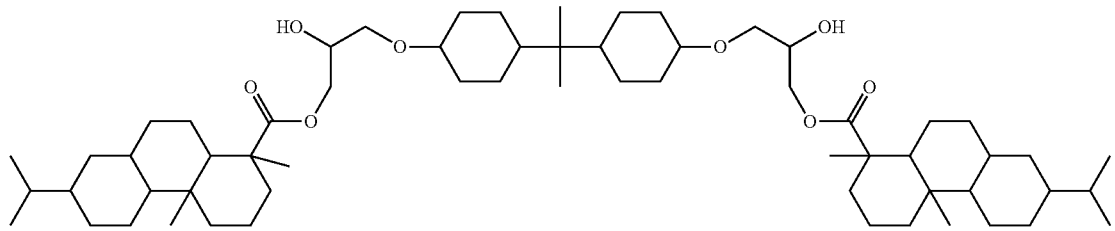

(42)

In the exemplified compounds of the specific rosin diols, each n represents an integer of 1 or greater.

The rosin diol can be synthesized by methods known in the art, for example, by the reaction of a difunctional epoxy compound and a rosin. The difunctional epoxy compound that may be used in the present exemplary embodiment is an epoxy group-containing compound including two epoxy groups in one molecule. Examples of such difunctional epoxy compounds include diglycidyl ethers of aromatic diols, diglycidyl ethers of aromatic dicarboxylic acids, diglycidyl ethers of aliphatic diols, diglycidyl ethers of alicyclic diols, and alicyclic epoxides.

Representative examples of the diglycidyl ethers of aromatic diols include diglycidyl ethers of bisphenol A, derivatives of bisphenol A, such as polyalkylene oxide adducts of bisphenol A, bisphenol F, derivatives of bisphenol F, such as polyalkylene oxide adducts of bisphenol F, bisphenol S, derivatives of bisphenol S, such as polyalkylene oxide adducts of bisphenol S, resorcinol, t-butylcatechol and biphenols as aromatic diol components.

Representative examples of the diglycidyl ethers of aromatic dicarboxylic acids include diglycidyl ethers of terephthalic acid, isophthalic acid and phthalic acid as aromatic dicarboxylic acid components.

Representative examples of the diglycidyl ethers of aliphatic diols include diglycidyl ethers of ethylene glycol, 1,2-propanediol, 1,3-propanediol, 1,4-butanediol, 1,5-pentanediol, 1,6-hexanediol, neopentyl glycol, 1,9-nonanediol, diethylene glycol, triethylene glycol, polyethylene glycol, polypropylene glycol, and polytetramethylene glycol as aliphatic diol components.

Representative examples of the diglycidyl ethers of alicyclic diols include hydrogenated bisphenol A, derivatives of hydrogenated bisphenol A, such as polyalkylene oxide adducts of hydrogenated bisphenol A, and cyclohexanedimethanol as alicyclic diol components.

Representative examples of the alicyclic epoxides include limonene dioxide.

The above epoxy group-containing compounds can be obtained by the reaction of, e.g., a diol component and an epihalohydrin. A higher molecular weight of the epoxy group-containing compounds may be accomplished by polycondensation depending upon a ratio of the diol component to the epihalohydrin.

In the present exemplary embodiment, the reaction of the rosin and the difunctional epoxy compound primarily progresses by the ring-opening reaction of the carboxyl group of the rosin and the epoxy group of the difunctional epoxy compound. At that time, the reaction is preferably performed at a temperature equivalent to or higher than the melting temperatures of both constituent components, or a temperature capable of homogeneously mixing both constituent components. Specifically, the reaction temperature is generally in the range of from 60° C. to 200° C. A catalyst may be added to accelerate the ring-opening reaction of the epoxy group.

The examples of the catalysts include amines, e.g., ethylenediamine, trimethylamine, and 2-methylimidazole, quaternary ammonium salts, e.g., triethylammonium bromide, triethylammonium chloride, and butyltrimethyl-ammonium chloride, and triphenylphosphine.

The reaction can be performed by various methods. Generally, in the case of a batch system, a rosin and a difunctional epoxy compound are charged in a flask having a heating function and equipped with a condenser tube, a stirrer, an inert gas inlet, and a thermometer, and heat-melted. The reaction progress may be traced by sampling the reactant. The degree of the reaction progress may be confirmed primarily by the reduction of the acid value, alternatively the reaction may be completed at the stoichiometric reaction terminal or at the point of time of arriving near the terminal point.

It is preferred to perform the reaction of the rosin and the difunctional epoxy compound in the reaction ratio of the range of from 1.5 mol to 2.5 mol of the rosin per mol of the difunctional epoxy compound, more preferably in the range of from 1.8 mol to 2.2 mol of the rosin per mol of the difunctional epoxy compound, and most preferably in the range of from 1.85 mol to 2.1 mol per mol of the difunctional epoxy compound, respectively. When the rosin is less than 1.5 mol, the epoxy group of the difunctional epoxy compound remains in the next polyester-manufacturing process, and abrupt molecular weight increase is caused by the function as the crosslinking agent, from which gelation might occur. While when the rosin is more than 2.5 mol, an unreacted rosin remains and there is apprehension that deterioration of charging due to rising of acid value might occur.

The rosin used in the exemplary embodiment is a generic name for resin acids obtainable from trees and is a naturally occurring substance which contains abietic acid, a kind of tricyclic diterpenes, and isomers thereof as main components.

In addition to abietic acid, the specific examples of the rosins include, e.g., palustris acid, neoabietic acid, pimaric acid, dehydroabietic acid, isopimaric acid, and sandaracopimaric acid. The rosin used in the exemplary embodiment is a mixture of these acids. Rosins are roughly classified into three kinds by the methods of collection, that is, tall rosins with pulps as raw materials, gum rosins with crude turpentine as raw materials, and wood rosins with stubbles of pine trees as raw materials. The rosins for use in the exemplary embodiment are preferably gum rosins or tall rosins for the reason of easily available.

These rosins are preferably purified. Purified rosins can be obtained by removing high molecular weight substances which are considered to be derived from the peroxides of resin acids from unpurified rosins, and removing unsaponified substances contained in unpurified rosins. Methods of purification are not especially restricted and any method may be selected from various known purification methods. Specifically, distillation, recrystallization and extraction are exemplified. Purification by distillation is industrially preferred. Distillation is generally selected considering the distillation time at from 200° C. to 300° C. and a pressure of 6.67 kPa or less. Recrystallization is performed, for example, by dissolving an unpurified rosin in a good solvent, distilling the solvent to obtain a concentrated solution, and then adding a poor solvent to the solution. As the examples of good solvents, aromatic hydrocarbons, e.g., benzene, toluene and xylene, chlorinated hydrocarbons, e.g., chloroform, alcohols, e.g., a lower alcohol, ketones, e.g., acetone, and acetic esters, e.g., ethyl acetate are exemplified. The examples of poor solvents include hydrocarbon solvents, e.g., n-hexane, n-heptane, cyclohexane, and isooctane. Extraction is a method of dissolving an unpurified rosin in alkaline water to make an alkaline aqueous solution, extracting the insoluble unsaponified substances contained therein with an organic solvent, and neutralizing the aqueous layer to obtain a purified rosin.

The rosin for use in the exemplary embodiment may be a disproportionated rosin. The disproportionated rosin is a rosin obtained by heating at a high temperature a rosin containing an abietic acid as the main component in the presence of a disproportionation catalyst to eliminate unstable conjugated double bonds in the molecule. The disproportionated rosin contains a mixture of a dehydroabietic acid and a dihydroabietic acid as main components.

The disproportionation catalyst may be any of those known in the art, for example, supported catalysts, e.g., palladium carbon, rhodium carbon and platinum carbon, metal powders, e.g., nickel and platinum, iodine, iodides, e.g., iron iodide, and phosphorus compounds are exemplified. The use amount of the disproportionation catalyst is generally preferably from 0.01% by mass to 5% by mass to the rosin, and more preferably 0.01% by mass to 1% by mass. The reaction temperature is preferably from 100° C. to 300° C., and is more preferably from 150° C. to 290° C. For controlling the amount of the dehydroabietic acid, for example, a dehydroabietic acid isolated by the method of crystallizing as an ethanolamine salt from the disproportionated rosin (J. Org. Chem., 31, 4246 (1996)) may be added to the disproportionated rosin prepared by heating at a high temperature in the presence of a disproportionation catalyst so as to reach the aiming amount of the dehydroabietic acid.

The rosin for use in the exemplary embodiment may be a hydrogenated rosin. The hydrogenated rosin contains a tetrahydroabietic acid and a dihydroabietic acid as the main components. The hydrogenated rosin may be obtained by eliminating unstable conjugated double bonds in the molecule according to a hydrogenation reaction known in the art. The hydrogenation reaction is carried out by heating an unpurified rosin in the presence of a hydrogenation catalyst under a hydrogen pressure of generally from 10 Kg/cm$^2$ to 200 Kg/cm$^2$, and preferably from 50 Kg/cm$^2$ to 150 Kg/cm$^2$. The hydrogenation catalyst may be any of those known in the art, for example, supported catalysts, e.g., palladium carbon, rhodium carbon and platinum carbon, metal powders, e.g., nickel and platinum, iodine, and iodides, e.g., iron iodide are exemplified. The use amount of the hydrogenation catalyst is generally from 0.01% to 5% by mass to the rosin, and preferably from 0.01% by mass to 1.0% by mass. The reaction is carried out at a temperature of from 100° C. to 300° C., and preferably from 150° C. to 290° C.

These disproportionated rosin and hydrogenated rosin may be purified by providing the purification process as described above before or after disproportionation treatment and hydrogenation treatment.

The rosins for use in the exemplary embodiment of the present invention may be a polymer rosin obtained by performing polymerization of a rosin, an unsaturated carboxylic acid-modified rosin obtained by the addition of an unsaturated carboxylic acid to a rosin, or may be a phenol-modified rosin. As the unsaturated carboxylic acids for use in the preparation of the unsaturated carboxylic acid-modified rosin, for example, maleic acid, maleic anhydride, fumaric acid, acrylic acid and methacrylic acid are exemplified. The unsaturated carboxylic acid-modified rosin is the one obtained by modification generally with from about 1 part by mass to 30 parts by mass of unsaturated carboxylic acids to 100 parts by mass of the raw material rosin.

The rosins for use in the exemplary embodiment are preferably purified rosins, disproportionated rosins and hydrogenated rosin of the above rosins, and these rosins may be used alone, or may be mixtures thereof.

As the alcohol components, dialcohol components other than the rosin diol may be used in combination.

The content of the rosin diol is preferably from 10 mol % to 100 mol % in the dialcohol components from the viewpoint of restraining liberation of an external additive while maintaining a broad fixing temperature region capable of reconciling a low temperature fixing property and an offset resisting property at a high temperature, and is more preferably from 20 mol % to 90 mol %.

As the alcohol components other than the rosin diols, at least one kind selected from the group consisting of aliphatic diols and etherified diphenols may be used so long as the performance of the toner is not lowered.

The examples of the aliphatic diols include, e.g., ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 3-hydroxy-2,2-dimethylpropyl-3-hydroxy-2,2-dimethylpropanoate, diethylene glycol, triethylene glycol, polyethylene glycol, dipropylene glycol, and polypropylene glycol. These aliphatic diols may be used alone, or may be used in combination of two or more kinds.

Further, in the present exemplary embodiment, an etherified diphenol may further be used together with the aliphatic diol. The etherified diphenol is a diol obtained by addition reaction of bisphenol A and an alkylene oxide. The alkylene oxide is an ethylene oxide or a propylene oxide. The average addition mol number of the alkylene oxide is preferably 2 mols or more and 16 mols or less per mol of the bisphenol A.

Trivalent or higher polyols may be used so long as the advantages of the exemplary embodiment are not impaired. The examples of the trivalent or higher polyols include glycerin, trimethylolethane, trimethylolpropane, and pentaerythritol. These polyols may be used alone, or two or more kinds may be used in combination. From the points of easy availability and reactivity, glycerin and trimethylolpropane are preferably used as the trivalent or higher polyols.

—Carboxylic Acid Component—

As a carboxylic acid component, a dicarboxylic acid is exemplified. For example, at least one kind selected from the group consisting of an aromatic dicarboxylic acid and an aliphatic dicarboxylic acid may be used. The examples of the dicarboxylic acids include, for example, aromatic dicarboxylic acids, e.g., phthalic acid, isophthalic acid, terephthalic acid, 1,4-naphthalenedicarboxylic acid, and 2,6-naphthalenedicarboxylic acid; aliphatic dicarboxylic acids, e.g., oxalic acid, malonic acid, maleic acid, fumaric acid, citraconic acid, itaconic acid, glutaconic acid, succinic acid, adipic acid, sebacic acid, azelaic acid, dimer acid, branched alkylsuccinic acid having 1 to 20 carbon atoms, and branched alkenylsuccinic acid having 1 to 20 carbon atoms and an alkenyl group; anhydrides of these acids; and alkyl esters of these acids (having 1 to 3 carbon atoms). In terms of durability and fixing property of a toner, dispersibility of a coloring agent, and easy availability, aromatic carboxylic acids, such as isophthalic acid and terephthalic acid, and aliphatic carboxylic acids, such as succinic acid, sebacic acid, and azelaic acid are preferred of these.

These aromatic dicarboxylic acids and aliphatic dicarboxylic acids may be used alone, or two or more kinds may be used in combination. In the range not impairing the advantages of the exemplary embodiment, trivalent or higher aromatic carboxylic acids may be used. The examples of the trivalent or higher carboxylic acids include trimellitic acid, pyromellitic acid, naphthalenetricarboxylic acid, benzophenonetetracarboxylic acid, biphenyltetracarboxylic acid, and anhydrides thereof, and these acids may be used alone, or two or more kinds may be used in combination. In terms of easy availability and reactivity, trimellitic anhydride is preferred as the trivalent or higher aromatic carboxylic acid.

—Synthesis Method of Specific Polyester Resin—

The specific polyester resin is prepared by a manufacturing method known and used in the art with the above acid components and alcohol components as raw materials. As the reaction methods, any of ester exchange reaction and direct esterification reaction can be applied. Further, polycondensation is accelerated by a method of raising the reaction temperature by under a pressure, and a method of flowing inert gas under a reduced pressure or normal pressure. Depending upon the reaction, a reaction catalyst such as at least one metal compound selected from the group consisting of antimony, titanium, tin, zinc, aluminum and manganese may be used to accelerate the reaction. The addition amount of the reaction catalyst is preferably from 0.01 parts by mass to 1.5 parts by mass per 100 parts by mass of total of the acid component and alcohol component, and more preferably from 0.05 parts by mass to 1.0 part by mass. The reaction can be performed at a temperature of from 180° C. to 300° C.

The specific polyester resin may be modified polyester resins. The modified polyester resins include grafted or blocked polyester resins with phenol, urethane or epoxy by the methods as disclosed in JP-A-11-133668, JP-A-10-239903 and JP-A-8-20636.

So long as the advantages of the exemplary embodiment are not impaired, other resins, for example, known binder resins, e.g., vinyl-based resins such as a styrene-acryl resin, an epoxy resin, a polycarbonate resin, and a polyurethane resin may be used in combination in the toners of the exemplary embodiment. The content of the specific polyester resin in the exemplary embodiment is preferably 70% by mass or more in the binder resin, more preferably 90% by mass or more, and still more preferably 100% by mass.

(Coloring Agent)

The coloring agent may be a dye or a pigment. A pigment is preferred in terms of light fastness and water fastness.

The coloring agent may be a pigment known in the art. Examples of preferred coloring agents include carbon black, aniline black, Aniline Blue, Calcoil Blue, Chrome Yellow, Ultramarine Blue, DuPont Oil Red, Quinoline Yellow, Methylene Blue Chloride, Phthalocyanine Blue, Malachite Green Oxalate, Lamp Black, Rose Bengal, quinacridone, Benzidine Yellow, C.I. Pigment Red 48:1, C.I. Pigment Red 57:1, C.I. Pigment Red 122, C.I. Pigment Red 185, C.I. Pigment Red 238, C.I. Pigment Yellow 12, C.I. Pigment Yellow 17, C.I. Pigment Yellow 180, C.I. Pigment Yellow 97, C.I. Pigment Yellow 74, C.I. Pigment Blue 15:1, and C.I. Pigment Blue 15:3.

The content of the coloring agent is preferably in the range of 1 part by mass to 30 parts by mass, based on 100 parts by mass of the binder resin. If needed, it is also effective to use a surface-treated coloring agent or a pigment dispersant. The color of the toner of the present exemplary embodiment can be determined by selecting the kind of the coloring agent. For example, the toner of the present exemplary embodiment may be yellow, magenta, cyan or black in color.

(Release Agent)

Examples of release agents include: paraffin waxes, such as low molecular weight polypropylenes, low molecular weight polyethylenes; silicone resins; rosins; rice wax; and carnauba wax. The melting temperatures of these release agents are preferably between 50° C. and 100° C., more preferably between 60° C. and 95° C. The content of the release agent in the toner is preferably from 0.5% by mass to 15% by mass, more preferably from 1.0% by mass to 12% by mass. The presence of the release agent in an amount of more than 0.5% by mass particularly prevents the occurrence of peeling defects in oilless fixing. Meanwhile, the presence of the release agent in an amount of less than 15% by mass improves image quality and reliability for image formation without causing deterioration in the flowability of the toner.

(Other Additives)

As other additives, for example, a charge controlling agent is exemplified. Those known in the art may be used as the charge controlling agent, or an azo-based metal complex compound, a metal complex compound of a salicylic acid, and a polar group-containing resin type charge controlling agent may be used.

<External Additive>

As external additives, silica particles are exemplified, and if necessary, other inorganic particles may be used in combination.

The external additive is preferably an external additive having a volume average particle diameter of from 10 nm to 100 nm in view of restraining liberation of the external additive still more.

This is presumed for the reason that when the volume average particle diameter is 10 nm or less, electrostatic attaching strength with the toner steeply weakens to thereby cause easy liberation, while when it is 100 nm or more, the external additive is liable to migrate into the cavities of the toner when a load is applied to the toner, and the external additive in the cavities is easily aggregated and easily liberated.

The volume average particle diameter of the external additive containing silica particles is preferably from 10 nm to 100 nm, and more preferably from 15 nm to 50 nm.

The volume average particle diameter of an external additive is found as follows. After externally adding (dispersing) an external additive to a toner, 500 primary particles of the external additive are observed with SEM (Scanning Electron Microscope) of 40,000 magnifications. The longest particle diameter and the shortest particle diameter of every particle are measured by image analysis of the primary particles, and from the intermediate value thereof, an equivalent sphere diameter is measured. The particle diameter of 50% in cumulative frequency (D50v) of the obtained equivalent sphere diameters is taken as the average particle diameter (i.e., the volume average particle diameter) of the external additive containing the silica particles.

Silica particles different in volume average particle diameter may be used in combination as the external additive.

For example, when silica particles having a small particle diameter and spherical silica particles having a large particle diameter are used in combination, it is thought that the surface of the intermediate transfer member is not liable to be scratched and shaved still more.

This is presumably for the reason that the large size silica particles have the effects of transferability and improvement of cleaning of the toner from the intermediate transfer member. Further, when the large size silica particles are brought into contact with the intermediate transfer member, tendency of the large size silica particles to directly attach to and to be stuck to the surface of the intermediate transfer member away from the surface of the toner is weak and liable to slide on the surface of the intermediate transfer member, and so they are presumably difficult to scratch or shave the surface of the intermediate transfer member.

It is good for both of the volume average particle diameter of the small particle diameter silica particles and the volume average particle diameter of the large particle diameter silica particles to satisfy the range of 10 nm to 100 nm. Specifically, the volume average particle diameter of the small particle diameter silica particles is preferably from 10 nm to 20 nm, and is more preferably from 12 nm to 15 nm. The volume average particle diameter of the large particle diameter silica particles is preferably from 30 nm to 100 nm, and is more preferably from 40 nm to 80 nm.

Further, the mass ratio of the small particle diameter silica particles to the large particle diameter silica particles (small size silica particles/large size silica particles) is preferably from 0.1 to 10, more preferably from 0.5 to 5, and still more preferably from 0.5 to 4.

The examples of inorganic particles as external additives include, for example, the particles of alumina, titanium oxide, barium titanate, magnesium titanate, calcium titanate, strontium titanate, zinc oxide, siliceous sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride. The particles of alumina, titanium oxide and barium titanate are preferred.

The proportion of external additives mixed in a toner is in the range of from 0.01 parts by mass to 5 parts by mass based on 100 parts by mass of the toner, and preferably from 0.01 parts by mass to 2.0 parts by mass.

<Characteristics of Toners>

The weight average molecular weight (Mw) of the soluble matter in tetrahydrofuran of a toner is preferably from 60,000 to 200,000 in view of capable of reconciling a low temperature fixing property and an offset resisting property at a high temperature, and more preferably from 70,000 to 150,000.

It is preferred that the peak of molecular weight distribution curve of the soluble matter in tetrahydrofuran of a toner measured by gel permeation chromatography (hereinafter simply referred to as "the peak of molecular weight distribution curve" in some cases) is present at least one between 1,000 and 50,000 in terms of capable of reconciling a low temperature fixing property and an offset resisting property at a high temperature still more.

The reason for this fact is presumably that dissolution becomes steeply, and so the toner is excellent in the fixing property, in particular, the fixing property at a low temperature.

The peak of molecular weight distribution curve is preferably present at least one between 1,000 and 50,000, and preferably present at least one between 1,500 and 40,000.

The peak of molecular weight distribution curve is the maximum value of the weight average molecular weight in the case where the weight average molecular weight of the soluble matter in tetrahydrofuran of a toner is measured by the method described later.

From the aspect of reconciling a low temperature fixing property and an offset resisting property at a high temperature, the number average molecular weight (Mn) of the soluble matter in tetrahydrofuran of a toner is preferably from 3,000 to 20,000 or from about 3,000 to about 20,000, and the ratio of the weight average molecular weight to the number average molecular weight (Mw/Mn) is preferably from 3 to 30 or from about 3 to about 30.

The reason for this fact is presumably that the design of a toner having sufficient strength as an image and excellent in a low temperature fixing property can be realized.

The number average molecular weight (Mn) of the soluble matter in tetrahydrofuran of a toner is preferably from 3,000 to 20,000 or from about 3,000 to about 20,000, more preferably from 3,300 to 18,000 or from about 3,300 to about 18,000, and still more preferably from 3,500 to 15,000 or from about 3,500 to about 15,000.

The ratio of the weight average molecular weight to the number average molecular weight in the soluble matter in tetrahydrofuran of a toner is (Mw/Mn) is preferably from 4 to 20 or from about 4 to about 20, and more preferably from 5 to 20 or from about 5 to about 20.

The peak of molecular weight distribution curve in the soluble matter in tetrahydrofuran of a toner, the weight average molecular weight and the number average molecular weight are measured with two lines of "HLC-8120GPC, SC-8020 (6.0 mm ID×15 cm, manufactured by Tosoh Corporation)" and tetrahydrofuran (THF) as the eluting solution, and by manufacturing the soluble matter in tetrahydrofuran of a toner.

The above soluble matter in tetrahydrofuran of the toner is manufactured by dissolving 0.5 mg of a toner sample in 1 g of tetrahydrofuran, and after dispersion by ultrasonic wave, the concentration of the solution is adjusted to 0.5%.

The experiment is performed on the condition of:
Concentration of the sample: 0.5%
Flow rate: 0.6 ml/min
Sample injection amount: 10 μl
Measurement temperature: 40° C.
Experiment is performed with an RI detector.

Further, calibration curves are plotted using ten samples of "polystyrene standard samples (TSK standard)": "A-500", "F-1", "F-10", "F-80", "F-380", "A-2500", "F-4", "F-40", "F-128" and "F-700".

The average degree of roundness of the toner according to the exemplary embodiment is preferably in the range of from 0.95 to 1.00 in the light of the transfer efficiency of toner and the uniformity of image quality.

Improvement of the powder flowability of the toner is considered as the reason for this.

The average degree of roundness of the toner is preferably in the range of from 0.95 to 1.00, and is more preferably in the range of from 0.96 to 0.99.

The average degree of roundness is found with FPIA-3000 (manufactured by Sysmex Co.). Each of photographed 5,000 or more particles is subjected to image analysis and statistic treatment. The degree of roundness of each particle is found in accordance with the following expression.

$$\text{Degree of roundness} = \text{peripheral length of equivalent circle diameter/peripheral length} = [2 \times (A \times \pi)^{1/2}]/PM$$

(wherein A represents the projected area of a particle, and PM represents the peripheral length of a particle)

The measurement is performed according to HPF mode (high resolution mode) and dilution of 10 magnifications. In analyzing the data, analysis of number particle diameter is performed in the range of from 3 μm to 80 μm and analysis of the degree of roundness is performed in the range of from 0.850 to 1.000 for the purpose of removal of measurement noises.

The shape factor SF1 of the toner according to the present exemplary embodiment is preferably in the range of 110 to 150, more preferably 120 to 140.

The shape factor SF1 is calculated by Equation 1:

$$SF1 = (ML^2/A) \times (\pi/4) \times 100 \quad (1)$$

where ML represents the absolute maximum length of the toner and A represents the projection area of the toner.

SF1 is mainly quantified by analyzing a microscope image or scanning electron microscope image using an image analyzer. First, an optical microscope image of particles spread on the surface of a slide glass is inputted to a Luzex image analyzer via a video camera. The maximum lengths and projection areas of 100 of the particles are measured and substituted into Equation 1. The obtained values are averaged.

The volume average particle diameter of the toner according to the present exemplary embodiment is preferably in the range of 8 μm to 15 μm, more preferably 9 μm to 14 μm, still more preferably 10 μm to 12 μm.

The volume average particle diameter of the toner is measured using a multisizer (manufactured by Beckman Coulter, Inc.) with an aperture diameter of 50 μm. The measurement is conducted after a dispersion of the toner in an aqueous electrolyte solution (an isotonic aqueous solution) is further dispersed by sonication for at least 30 seconds or more.

<Manufacturing Method of Toner>

The manufacturing method of the toner in the exemplary embodiment is described below.

Toner particles may be manufactured by any of dry manufacturing methods (e.g., a kneading pulverization method) and wet manufacturing methods (e.g., an aggregation coalescence method, a suspension polymerization method, a dissolution suspension granulation method, a dissolution suspension method, and a dissolution emulsification aggregation coalescence method). These manufacturing methods are not especially restricted and the methods known in the art are adopted.

A method for obtaining toner particles by an aggregation coalescence method is described below.

The manufacturing method is specifically as follows.

Incidentally, a method for obtaining toner particles containing a coloring agent and a release agent is described in the following, but a coloring agent and a release agent are those used according to necessity. Additives other than a coloring agent and a release agent may be used as a matter of course.

—Preparation Process of Resin Particle Dispersion—

In the first place, coloring agent particle dispersion wherein coloring agent particles are dispersed and release agent particle dispersion wherein release agent particles are dispersed are prepared together with resin particle dispersion wherein polyester resin particles (specific polyester resin particles) are dispersed.

Here, the resin particle dispersion is prepared by dispersing polyester resin particles in a dispersion medium by a surfactant.

As the dispersion medium for use in resin particle dispersion, for example, an aqueous medium is exemplified.

As the aqueous medium, water, e.g., distilled water and ion exchange water, and alcohols are exemplified. These aqueous media may be used alone, or two or more kinds may be used in combination.

Surfactants are not especially restricted, and for example, anionic surfactants, such as sulfuric ester-based, sulfonic ester-based, phosphoric ester-based, and soap-based surfactants; cationic surfactants, such as amine salt type and quaternary ammonium salt type; and nonionic surfactants, such as polyethylene glycol-based, alkylphenol ethylene oxide adduct-based, and polyhydric alcohol-based surfactants are exemplified. Of these surfactants, anionic surfactants and cationic surfactants are especially preferably exemplified. Nonionic surfactants may be used in combination with anionic surfactants and cationic surfactants.

Surfactants may be used one kind alone, or two or more kinds may be used in combination.

For dispersing polyester resin particles in a dispersion medium in resin particle dispersion, ordinary dispersing methods using, for example, a rotary shearing-type homogenizer, a ball mill having media, a sand mill and a DYNO-MILL are exemplified. Depending upon the kind of resin particles to be used, resin particles may be dispersed in resin particle dispersion by using, for example, a phase reversal emulsification method.

The phase reversal emulsification method is a method of dispersing a resin in an aqueous medium in a particulate state by dissolving the resin to be dispersed in a hydrophobic organic solvent in which the resin is soluble, neutralizing the solution by adding a base to the organic continuous phase (O phase), and introducing an aqueous medium (W phase), to thereby reverse resin from W/O to O/W (what is called phase reversal of emulsion) to make a discontinuous phase.

As the volume average particle diameter of the polyester resin particles dispersed in resin particle dispersion, for example, the range of from 0.01 μm to 1 μm can be exemplified, it may be from 0.08 μm to 0.8 μm, or it may be from 0.1 μm to 0.6 μm.

The volume average particle diameter of resin particles is measured with a laser diffraction system particle diameter distribution measuring instrument (LA-920, manufactured by Horiba, Ltd.). Hereinafter, the volume average particle diameter of particles is measured in the same manner unless otherwise indicated.

The content of polyester resin particles contained in resin particle dispersion is, for example, from 5% by mass to 50% by mass, and the content may be from 10% by mass to 40% by mass.

Coloring agent dispersion and release agent dispersion are also prepared in the same manner with the resin particle dispersion. That is, the volume average particle diameter of the particles in resin particle dispersion, the dispersion medium, the dispersing method, and the content of the particles are also the same with coloring agent particles dispersed in coloring agent dispersion and release agent particles dispersed in release agent dispersion.

Forming Process of Aggregated Particles

In the next place, coloring agent particle dispersion and release agent particle dispersion are mixed with resin particle dispersion.

Polyester resin particles, coloring agent particles and release agent particles are heterogeneously aggregated in the mixed dispersion to form aggregated particles containing polyester resin particles, coloring agent particles and release agent particles having a particle diameter near to the particle diameter of the aiming toner particles.

Specifically, for example, a flocculating agent is added to the mixed dispersion and pH of the mixed dispersion is adjusted to acidic (for example, pH is from 2 to 5), and if necessary, after adding a dispersion stabilizer, the mixed dispersion is heated to the glass transition temperature of the polyester resin particles (specifically, for example, the glass transition temperature of the polyester resin particles $-30°$ C. or more and the glass transition temperature $-10°$ C. or less), and the particles dispersed in the mixed dispersion are aggregated to form aggregated particles.

In the forming process of aggregated particles, for example, the flocculating agent may be added at room temperature (e.g., 25° C.) with stirring the mixed dispersion with a rotary shearing-type homogenizer, and pH of the mixed dispersion is adjusted to acidic (for example, pH is from 2 to 5), and if necessary, after adding a dispersion stabilizer, the mixed dispersion may be heated.

As flocculating agents, surfactants having reverse polarity to the surfactants used as the dispersants to be added to the mixed dispersion, for example, inorganic metal salts and divalent or higher metal complexes are exemplified. In particular, when a metal complex is used as the flocculating agent, the amount of the surfactant to be used is reduced and electrostatic properties is improved.

An additive forming a complex or simulated bonding with the metal ion of the flocculating agent may be used, if necessary. As such an additive, a chelating agent is preferably used.

The examples of the inorganic metal salts include metal salts, e.g., calcium chloride, calcium nitrate, barium chloride, magnesium chloride, zinc chloride, aluminum chloride, and aluminum sulfate, and inorganic metal salt polymers, e.g., aluminum polychloride, aluminum polyhydroxide, and calcium polysulfide.

As chelating agents, water-soluble chelating agents may be used. The examples of chelating agents include, for example, hydroxycarboxylic acid, e.g., tartaric acid, citric acid, and gluconic acid, iminodiacid (IDA), nitrilotriacetic acid (NTA), and ethylenediaminetetraacetic acid (EDTA).

The addition amount of chelating agent is, for example, from 0.01 parts by mass to 5.0 parts by mass based on 100 parts by mass of the polyester resin particles, and the amount may be 0.1 parts by mass or more and less than 3.0 parts by mass.

—Fusing and Coalescence Process—

Next, the aggregated particle dispersion wherein the aggregated particles are dispersed is heated at a temperature higher than the glass transition temperature of the polyester resin particles (for example, a temperature higher than the glass transition temperature of the polyester resin particles by 10° C. to 30° C.) to thereby fuse and coalesce the aggregated particles and form toner particles.

Toner particles are obtained through the above-described processes.

Incidentally, toner particles may also be manufactured through the following processes. That is, after obtaining aggregated particle dispersion wherein aggregated particles are dispersed, the aggregated particle dispersion and the polyester resin particle dispersion wherein polyester resin particles (particles of the polyester resin according to the present exemplary embodiment) are dispersed may further be mixed and aggregated to attach the polyester resin particles to the surfaces of the aggregated particles (a process for forming second aggregated particles), and second aggregated particle dispersion wherein the second aggregated particles are dispersed is heated to fuse and coalesce the second aggregated particles to form toner particles having a core/shell structure (a process for forming core/shell structure toner particles).

After termination of fusing and coalescence process, the toner particles formed in the solution are subjected to known washing process, solid-liquid separating process and drying process, thus dried toner particles are obtained.

In the washing process, in consideration of electrostatic properties of the toner, it is preferred to perform sufficient displacement washing by ion exchange water. The solid-liquid separating process is not especially restricted, but in terms of productivity, suction filtration and pressure filtration are preferably used. Further, the drying process is not also particularly restricted, but from the point of productivity, freeze drying, flash jet drying, fluidized drying and vibrating type fluidized drying are preferably used.

The toner in the exemplary embodiment is manufactured, for example, by adding an external additive to the toner particles in the obtained dried state and mixing. Mixing is preferably performed with a V-type blender, a Henschel mixer, or a Roedige mixer. Further, if necessary, coarse particles of the toner may be removed with a vibration-type sieving machine or a window power sieving machine

[Electrostatic Image Developer]

The developer according to the exemplary embodiment contains at least the toner in the exemplary embodiment.

The toner in the exemplary embodiment is used as it is as a one-component developer or as a two-component developer. When the toner is used as a two-component developer, it is used as a mixture with a carrier.

The carriers which can be used with a two-component developer are not especially restricted, and known carriers may be used. For example, magnetic metals, e.g., iron oxide, nickel and cobalt, magnetic oxides, e.g., ferrite and magnetite, resin-coated carriers having resin coating layers on the surfaces of these core materials, and magnetic dispersion type carriers are exemplified. Magnetic dispersion type carriers containing an electrically conductive material dispersed in a matrix resin may also be used.

The mixing ratio of the toner and carrier in the two-component developer (ratio by mass) is preferably toner/carrier of 1/100 to 30/100 or so, and more preferably 3/100 to 20/100 or so.

[Image Forming Apparatus and Image Forming Method]

The image forming apparatus and image forming method in the exemplary embodiment will be described in the next place.

The image forming apparatus in the exemplary embodiment includes an image holding member, a charging unit for charging the surface of the image holding member, an electrostatic image forming unit for forming an electrostatic image on the surface of the image holding member, a developing unit accommodating the electrostatic image developer and forming a toner image by developing the electrostatic image with the electrostatic image developer, a transfer unit for transferring the toner image to a recording medium, and a fixing unit for fixing the toner image on the recording member.

As the electrostatic image developer, the electrostatic image developer according to the exemplary embodiment is used.

The transfer unit may be a unit having an intermediate transfer member to which the toner image formed on the image holding member is transferred, a first transfer unit to transfer the toner image formed on the image holding member to the intermediate transfer member, and a second transfer member to transfer the toner image on the intermediate transfer member to a recording member.

In the image forming apparatus in the exemplary embodiment, a part including a developing unit may have a cartridge structure (a process cartridge) attachable to and detachable from the image forming apparatus. As the process cartridge, a process cartridge containing the electrostatic image developer according to the exemplary embodiment and having a developing unit is preferably used.

The image forming method in the present exemplary embodiment has a charging process of charging the surface of the image holding member, an electrostatic image forming process of forming an electrostatic image on the surface of the image holding member, a developing process of developing the electrostatic image with the electrostatic image developer to form a toner image, a transfer process of transferring the toner image to a recording medium, and a fixing process of fixing the toner image on the recording medium.

As the electrostatic image developer, the electrostatic image developer according to the present exemplary embodiment is used.

The transfer process may be a unit having a first transfer unit to transfer the toner image formed on the image holding member to the intermediate transfer member, and a second transfer member to transfer the toner image on the intermediate transfer member to a recording member.

An example of the image forming apparatus according to the present exemplary embodiment will explained below, but the present exemplary embodiment is not limited thereto. Further, the main units of the image forming apparatus illustrated in the drawing will be explained, and explanation of the other units is omitted.

FIG. 1 is a schematic view illustrating a quadruple tandem type color image forming apparatus. The image forming apparatus illustrated in FIG. 1 includes first, second, third and fourth image forming units 10Y, 10M, 10C and 10K of electrophotographic mode outputting yellow (Y), magenta (M), cyan (C) and black (K) color images based on color-separated image data. The image forming units (hereinafter, also referred to simply as "units") 10Y, 10M, 10C and 10K are arranged in parallel at predetermined intervals in a horizontal direction. The units 10Y, 10M, 10C and 10K may be process cartridges that can be detachably attached to a main body of the image forming apparatus.

As illustrated in FIG. 1, an intermediate transfer belt 20 (as an intermediate transfer member) is installed to run on top of the units 10Y, 10M, 10C and 10K. The intermediate transfer belt 20 is installed to wind a drive roller 22 and a support roller 24 in contact with the inner side thereof. The intermediate transfer belt 20 runs in a direction from the first unit 10Y toward the fourth unit 10K. The support roller 24 is pressed in a direction away from the drive roller 22 by a spring (now shown). A predetermined tension is given on the intermediate transfer belt 20 winding the two rollers. At a lateral surface of a latent image holding member of the intermediate transfer belt 20, an apparatus 30 for cleaning the intermediate transfer material is provided opposite the drive roller 22.

Developing apparatuses (or developing units) 4Y, 4M, 4C and 4K of the units 10Y, 10M, 10C and 10K can supply toners of four colors, i.e. yellow, magenta, cyan and black colors, accommodated in the toner cartridges 8Y, 8M, 8C and 8K, respectively.

Since the four units 10Y, 10M, 10C and 10K have the same constitution, the explanation of the first unit 10Y, which is arranged upstream the running direction of the intermediate transfer belt, can be applied to the other units. The units 10M, 10C and 10K include parts corresponding to the parts of the first unit 10Y and designated by letters M (magenta), C (cyan) and K (black) instead of Y (yellow), respectively, and their description is omitted.

The first unit 10Y has a photoconductor 1Y acting as a latent image holding member. A roller 2Y for electrically charging the surface of the photoconductor 1Y with a predetermined potential, an apparatus 3 for exposing the electrically charged surface to a laser beam 3Y based on color-separated image signals to form an electrostatic latent image, an apparatus (or a unit) 4Y for feeding an electrically charged toner to the electrostatic latent image to develop the electrostatic latent image, a primary transfer roller (or a primary transfer unit) 5Y for transferring the developed toner image to the intermediate transfer belt 20, and a cleaning apparatus (or a cleaning unit) 6Y for removing the toner remaining on the surface of the photoconductor 1Y after the primary transfer are arranged around the photoconductor 1Y.

The primary transfer roller 5Y is arranged at the inner side of the intermediate transfer belt 20 and is installed in a position opposite the photoconductor 1Y. A bias power supply (not shown) is connected and apply a primary transfer bias to each of the primary transfer rollers 5Y, 5M, 5C and 5K. The transfer bias applied to each of the primary transfer rollers from the bias power supply is varied by a control unit (not shown).

Hereinafter, an explanation will be given concerning the formation operation of a yellow image in the first unit 10Y. Prior to the operation, the surface of the photoconductor 1Y is electrically charged to about −600 V to about −800 V by the roller 2Y.

The photoconductor 1Y is formed by laminating a photosensitive layer on a conductive base having a volume resistivity of $1 \times 10^{-6}$ Ω·cm or less at 20° C. Although the resistance of the photosensitive layer is usually high (comparable to that of general resins), the resistivity of a portion of the photosensitive layer irradiated with the laser beam 3Y tends to vary. Depending on yellow image data sent from a control unit (not shown), the exposure apparatus 3 outputs the laser beam 3Y to the surface of the electrically charged photoconductor 1Y. The laser beam 3Y is irradiated onto the surface of the photoconductor 1Y to form an electrostatic latent image in a yellow factor pattern on the surface of the photoconductor 1Y.

The electrostatic latent image refers to an image formed on the surface of the photoconductor 1Y by electrostatic charging. The electrostatic latent image is formed in the form of a so-called negative latent image because electrical charges flow on the surface of irradiated portions of the photoconductor 1Y due to the decreased resistivity of the irradiated portions but electrical charges remain on portions non-irradiated with the laser beam 3Y.

The electrostatic latent image formed on the photoconductor 1Y is rotated up to a predetermined development position according to the running motion of the photoconductor 1Y. At the development position, the electrostatic latent image on the photoconductor 1Y is visualized (developed) by the developing apparatus 4Y.

The yellow developer accommodated in the developing apparatus 4Y is friction-charged while agitating inside the developing apparatus 4Y, possesses the same polarity (negative polarity) as the counter charges charged on the photoconductor 1Y, and is maintained on a developer roll (or a developer holding member). When the surface of the photoconductor 1Y passes through the developing apparatus 4Y, the yellow toner is electrostatically attached to the antistatic latent image portions on the surface of the photoconductor 1Y. As a result, the latent image is developed with the yellow toner. The photoconductor 1Y, on which the yellow toner image is formed, runs continuously at a predetermined speed to allow the toner image developed on the photoconductor 1Y to be conveyed to a predetermined primary transfer position.

When the yellow toner image on the photoconductor 1Y is conveyed to the primary transfer position, a predetermined primary transfer bias is applied to the primary transfer roller 5Y to allow an electrostatic force directing toward the primary transfer roller 5Y from the photoconductor 1Y to act on the toner image. As a result, the toner image on the photoconductor 1Y is transferred to the intermediate transfer belt 20. The applied transfer bias has a polarity (+) opposite to the polarity (−) of the toner. In the first unit 10Y, for example, the applied transfer bias is controlled to about +10 μA by a control unit (not shown).

The toner remaining on the photoconductor 1Y is removed by the cleaning apparatus 6Y and is then collected.

The primary transfer biases applied to the primary transfer rollers 5M, 5C, 5K are controlled in substantially the same manner as in the first unit.

The intermediate transfer belt 20, to which the yellow toner image is transferred, is sequentially conveyed from the first unit 10Y to the second, third and fourth units 10M, 10C and 10K. As a result of this sequential conveying, toner images of different colors overlap to form one overlapping toner image.

The intermediate transfer belt 20, where the four toner images overlap while passing through the first, second, third and fourth units, reaches a secondary transfer unit including the intermediate transfer belt 20, the support roller 24 in contact with the inner side of the intermediate transfer belt 20 and a secondary transfer roller (or a secondary transfer unit) 26 arranged on an image holding surface of the intermediate transfer belt 20. A recording paper (or a recording medium) P is fed at a predetermined timing into a gap between the secondary transfer roller 26 and the intermediate transfer belt 20, which are in contact with each other under pressure, through a feed mechanism and a predetermined secondary transfer bias is applied to the support roller 24. The applied transfer bias has the same polarity (−) as the polarity (−) of the toner and an electrostatic force directing toward the recording medium P from the intermediate transfer belt 20 acts on the overlapping toner image to allow the overlapping toner image on the intermediate transfer belt 20 to be transferred to the recording paper P. The secondary transfer bias is determined depending on the resistance of the secondary transferring unit, which is detected by a detecting unit (not shown), and the voltage thereof is controlled.

Thereafter, the recording paper P is sent to a fixing apparatus (or a fixing unit) 28. In the fixing apparatus, the overlapping toner image is heat-melted and fixed on the recording paper P. After the fixing of the color image is finished, the recording paper P is conveyed to the discharging unit by a convey roll (or a discharge roll) 32, completing the series of color image forming operations.

The image forming apparatus is constructed such that the overlapping toner image is transferred to the recording paper P through the intermediate transfer belt 20, but is not limited to this construction. For example, the image forming apparatus may have a construction that allows for direct transfer of the toner image from the photoconductor to the recording paper.

<Process Cartridge and Toner Cartridge>

Figure 2:
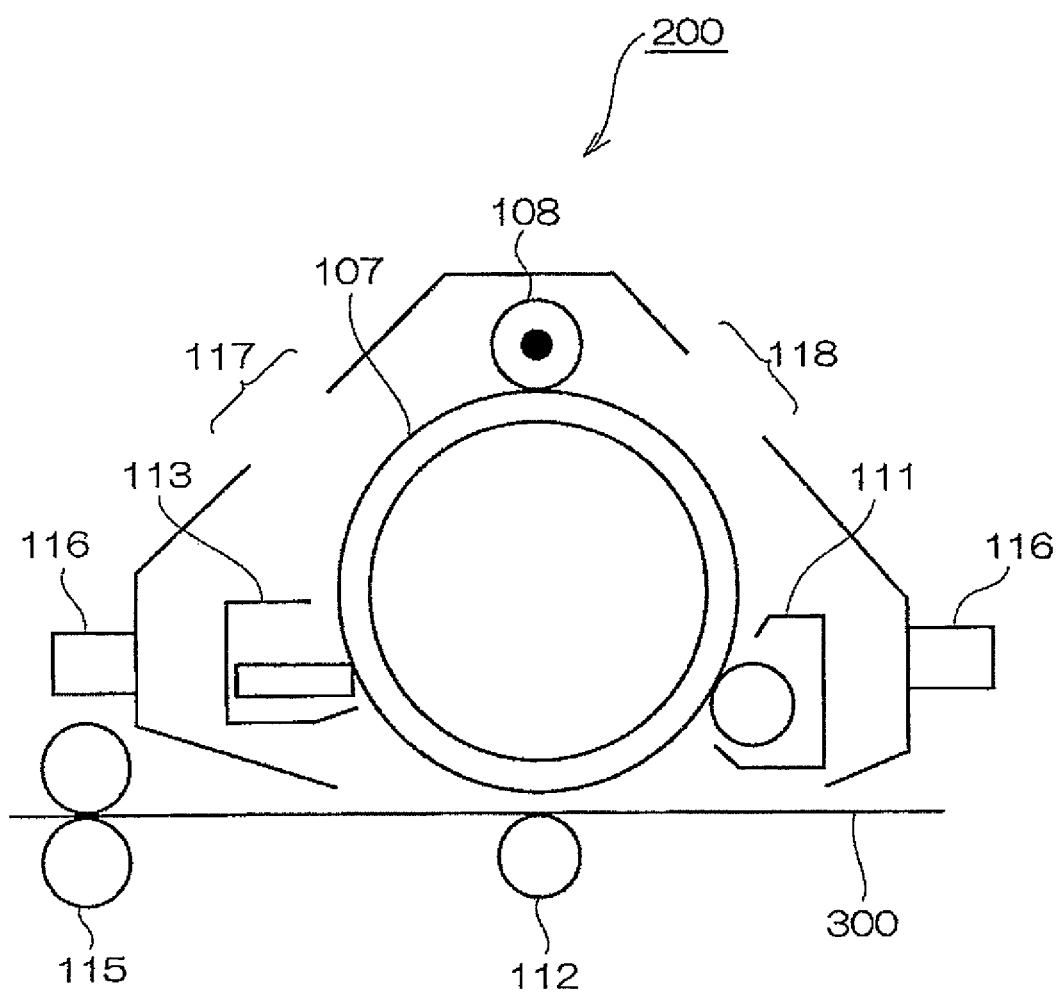
FIG. 2 is a schematic drawing showing an example of a process cartridge in the exemplary embodiment, wherein 1Y, 1M, 1C, 1K, 107 denotes Photoconductor (image holding member); 2Y, 2M, 2C, 2K, 108 denote Roller; 3Y, 3M, 3C, 3K denote Laser Beam; 3 denotes Exposure Apparatus; 4Y, 4M, 4C, 4K, 111 denote Developing Apparatus (developing unit); 5Y, 5M, 5C, 5K denote Primary Transfer Roller; 6Y, 6M, 6C, 6K, 113 denote Cleaning Apparatus (cleaning unit); 8Y, 8M, 8C, 8K denote Toner Cartridge; 10Y, 10M, 10C, 10K denote Unit; 20 denotes Intermediate Transfer Belt (intermediate transfer member); 22 denotes Drive Roller; 24 denotes Support Roller; 26 denotes Secondary Transfer Roller (transfer unit); 28, 115 denote Fixing Apparatus (fixing unit); 30 denotes Apparatus for cleaning Intermediate Transfer Member; 32 denotes Convey Roll (discharge roll); 112 denotes Transfer Apparatus; 116 denotes Rail; 117 denotes Opening for Antistatic Exposure; 118 denotes Opening for Exposure; 200 denotes Process Cartridge; P, 300 denotes Recording Paper (recording medium).

FIG. 2 is a schematic view illustrating the constitution of a suitable example of a process cartridge accommodating the developer of the present exemplary embodiment. As illustrated in FIG. 2, the process cartridge 200 is a combination of a photoconductor 107, an electrically charging roller 108, a developing apparatus 111, a photoconductor cleaning apparatus (or a cleaning unit) 113, an opening for exposure 118 and an opening for antistatic exposure 117 on a rail 116, which are integrated into one cartridge.

The process cartridge 200 is freely attached detachably to a transfer apparatus 112, a fixing apparatus 115 and a main body of an image forming apparatus including other elements (not shown). The process cartridge 200 is combined with the main body to construct an image forming apparatus. Reference numeral 300 indicates a recording paper.

The photoconductor 107, the electrically charging roller 108, the developing apparatus 111, the cleaning unit 113, the opening for exposure 118 and the opening for antistatic exposure 117 included in the process cartridge 200 illustrated in FIG. 2 may be selectively combined. For example, the process cartridge of the present exemplary embodiment may include the developing apparatus 111 and at least one element selected from the group consisting of the photoconductor 107, the electrically charging roller 108, the developing apparatus 111, the cleaning apparatus (cleaning unit) 113, the opening for exposure 118 and the opening for antistatic exposure 117.

Next, an explanation will be given concerning a toner cartridge.

The toner cartridge is attached detachably to the image forming apparatus and at least accommodates a toner that is fed into the developing unit installed in the image forming apparatus. The toner is the toner of the present exemplary embodiment explained already. The construction of the toner cartridge is not limited so long as the toner is accommodated in the toner cartridge. A developer may be accommodated in the toner cartridge depending on the mechanism of the image forming apparatus.

The image forming apparatus illustrated in FIG. 1 is constructed such that the toner cartridges 8Y, 8M, 8C and 8K are attached detachably. The developing apparatuses 4Y, 4M, 4C and 4K are connected to corresponding toner cartridges through developer feed paths (not shown) depending on the colors thereof. The toner cartridges can be exchanged with new ones when the developers accommodated in the toner cartridges are substantially used up.

The present exemplary embodiments will be explained in detail with reference to the following examples but are not limited thereto. In the examples, unless otherwise indicated, all parts and percentages are by mass.

<Synthesis of Resin Diols>

—Rosin Diol (1)—

A stainless steel reaction vessel provided with a stirrer, a heater, a condenser tube and a thermometer is charged with 113 parts of bisphenol A glycidyl ether (trade name: JER828, Mw: 340.41, manufactured by Mitsubishi Chemical Corporation) as the difunctional epoxy compound, 200 parts of gum rosin (Mw: 302.45) having been subjected to purification treatment with distilled water (distillation condition: 6.6 kPa, 220° C.) as the rosin component, and 0.5 parts of tetraethylammonium bromide (manufactured by Tokyo Chemical Industry Co., Ltd.) as the reaction catalyst. The temperature is raised to 130° C., and ring-opening reaction of the acid groups of the rosin and the epoxy groups of the epoxy compound is carried out. The reaction is performed continuously at the same temperature for 4 hours. At the time when the acid value reaches 0.5 mg KOH/g, the reaction is stopped and exemplified rosin diol (1) is obtained.

—Rosin Diol (2)—

A stainless steel reaction vessel provided with a stirrer, a heater, a condenser tube and a thermometer is charged with 103 parts of ethylene glycol diglycidyl ether (Mw: 174, manufactured by Tokyo Chemical Industry Co., Ltd.) as the difunctional epoxy compound, 214 parts of wood rosin (Mw: 310) as the rosin component, and 0.5 parts of tetraethylammonium bromide (manufactured by Tokyo Chemical Industry Co., Ltd.) as the reaction catalyst. The temperature is raised to 130° C., and ring-opening reaction of the acid groups of the rosin and the epoxy groups of the epoxy compound is carried out. The reaction is performed continuously at the same temperature for 4 hours. At the time when the acid value reaches 0.5 mg KOH/g, the reaction is stopped and exemplified rosin diol (2) is obtained.

<Synthesis of Specific Polyester Resin>

—Specific Polyester Resin 1—

A stainless steel reaction vessel provided with a stirrer, a heater, a thermometer, a fractional distilling instrument, and a nitrogen gas introducing tube is charged with 473 parts of specific rosin diol (1) as the alcohol component, 83 parts of terephthalic acid (manufactured by Wako Pure Chemical Industries) and 5 parts of trimellitic acid (manufactured by Wako Pure Chemical Industries) as the acid components, and 0.3 parts of tetra-n-butyl titanate (manufactured by Tokyo Chemical Industry Co., Ltd.) as the reaction catalyst, and polycondensation reaction is continued under nitrogen atmosphere with stirring at 230° C. for 7 hours. When objective molecular weight and acid value are reached, the reaction is stopped to thereby synthesize specific polyester resin 1.

—Specific Polyester Resins 2 to 4 and Comparative Polyester Resins 1 and 2—

Specific polyester resins 2 to 4 and comparative polyester resins 1 and 2 are synthesized in the same manner as in the synthesis of specific polyester resin 1 except for changing the kinds and the contents of the rosin diols and carboxylic acid components as shown in Table 1 below.

TABLE 1

| | | Toner Particles 1 Specific Polyester Resin 1 | Toner Particles 2 Specific Polyester Resin 2 | Toner Particles 3 Specific Polyester Resin 3 | Toner Particles 4 Specific Polyester Resin 4 | Comparative Toner Particles 1 Comparative Specific Polyester Resin 1 | Comparative Toner Particles 2 Comparative Specific Polyester Resin 2 |
|---|---|---|---|---|---|---|---|
| Acid Component | Terephthalic acid | 83 parts | — | — | 66 parts | 66 parts | — |
| | Isophthalic acid | — | 83 parts | 75 parts | — | — | 54 parts |
| | Adipic acid | — | — | 7 parts | — | — | — |
| | Dodecenylsuccinic acid | — | — | — | 27 parts | 27 parts | 7 parts |
| | Trimellitic acid | 5 parts | 8 parts | 8 parts | 3 parts | 8 parts | 4 parts |
| Alcohol Component | Rosin diol | (1) 473 parts | (2) 459 parts | (1) 387 parts | (2) 360 parts | (1) 312 parts | (2) 345 parts |
| | 1,3-Propanediol | — | — | — | 8 parts | — | — |
| | Hexanediol | — | — | 12 parts | — | — | 8 parts |
| | Neopentyl glycol | — | — | — | — | 10 parts | — |
| Weight average molecular weight (Mw) | | 65,000 | 75,000 | 110,000 | 180,000 | 55,000 | 240,000 |
| Number average molecular weight (Mn) | | 3,500 | 5,500 | 15,000 | 36,000 | 24,000 | 120,000 |
| Mw/Mn | | 18 | 14 | 7.3 | 5.0 | 2.3 | 20 |
| Peak of molecular weight distribution curve | | 14,000 | 18,000 | 15,000 | 25,000 | 2,500 | 2,400 |
| Acid value (mg KOH/g) | | 11.5 | 12.0 | 12.2 | 12.2 | 13.5 | 14.5 |
| Glass transition temperature (° C.) | | 65 | 60 | 57 | 60 | 56 | 59 |

Weight average molecular weight, number average molecular weight, Mw/Mn and peak of molecular weight distribution curve are the values of the soluble matter in tetrahydrofuran of the toner (toner particles).

<Toner Particles>

(Toner Particles 1)

—Manufacture of Amorphous Polyester Resin Particle Dispersion—

The above manufactured specific polyester resin 1 (200 parts by mass) is placed in a high temperature and high pressure emulsifying apparatus (CAVITRON CD1010, manufactured by Eurotec Ltd.) and is melted by heating at a temperature of 120° C. Diluted aqueous ammonia (0.37% by mass) obtained by diluting reagent aqueous ammonia with ion exchange water is put in a separately prepared aqueous medium tank, and the aqueous ammonia is transferred to CAVITRON at a rate of 0.1 liters per minute while heating at 120° C. with a heat exchanger.

CAVITRON is driven at revolution speed of the rotator of 60 Hz and pressure of 5 kg/cm$^2$ to obtain amorphous polyester resin particle dispersion having a volume average particle diameter of 160 nm and a solid content of 30% by mass by specific polyester resin 1.

—Manufacture of Coloring Agent Particle Dispersion—

The following components are mixed and dispersed with a high pressure impact type disperser Altimizer (HJP30006, manufactured by Sugino Machine Limited) for 1 hour to obtain coloring agent particle dispersion having a volume average particle diameter of 180 nm and a solid content of 20% by mass.

| | |
|---|---|
| Cyan pigment (Pigment Blue 15:3, manufactured by Dainichiseika Color & Chemicals Mfg. Co., Ltd.) | 10 parts by mass |
| Anionic surfactant (Neogen SC, manufactured by Dai-Ichi Kogyo Seiyaku Co., Ltd.) | 2 parts by mass |
| Ion exchange water | 80 parts by mass |

—Manufacture of Crystalline Polyester Resin Particle Dispersion—

A flask is charged with 115 parts by mass of dodecanoic diacid (manufactured by Tokyo Chemical Industry Co., Ltd.) and 101 parts by mass of dodecanediol (manufactured by Ube Industries Ltd.). The temperature is raised to 160° C. over 1 hour, and after confirming that the reaction system is stirred, 0.02 parts by mass of dibutyltin oxide is thrown thereinto. The temperature is further raised from 160° C. to 200° C. over 6 hours with distilling the generated water. Dehydration condensation reaction is continued for further 4 hours at 200° C., and the reaction is terminated. After cooling the reaction solution, the solution is subjected to solid-liquid separation, and the obtained solid is dried at 40° C. under the vacuum condition to thereby obtain a crystalline polyester resin.

After heating the following components including the obtained crystalline polyester resin at 120° C. and dispersing with ULTRA-TURRAX T50 (manufactured by IKA), the solution is subjected to dispersion treatment with a pressure discharge type homogenizer, and collected when the volume average particle diameter reaches 180 nm.

Thus, crystalline polyester resin particle dispersion having a solid content of 20% by mass is obtained.

| | |
|---|---|
| Crystalline polyester resin | 50 parts by mass |
| Anionic surfactant (Neogen SC, manufactured by Dai-Ichi Kogyo Seiyaku Co., Ltd.) | 2 parts by mass |
| Ion exchange water | 200 parts by mass |

—Manufacture of Toner Particles 1—

| | |
|---|---|
| Amorphous polyester resin particle dispersion | 150 parts by mass |
| Coloring agent particle dispersion | 25 parts by mass |
| Crystalline polyester resin particle dispersion | 50 parts by mass |
| Polyaluminum chloride | 0.4 parts by mass |
| Ion exchange water | 100 parts by mass |

The above components are mixed and dispersed with ULTRA-TURRAX T50 (manufactured by IKA) in a round flask, and then heated up to 48° C. while stirring the flask in an oil bath for heating. The reaction system is retained at 48° C. for 60 minutes, and then 70 parts by mass of amorphous polyester resin particle dispersion is added thereto.

After that, the pH in the reaction system is adjusted to 8.0 with a sodium hydroxide aqueous solution of concentration of 0.5 mol/L. The stainless steel flask is then sealed. The flask is heated up to 90° C. while sealing the shaft of stirrer by magnetic seal and stirring is continued, and retained for 3 hours.

After finish the reaction, the system is cooled at a temperature lowering speed of 2° C./min, filtered, washed thoroughly with ion exchange water, solid-liquid separated by Nutsche suction filtration, re-dispersed in 3 liters of ion exchange water at 30° C., stirred at 300 rpm for 15 minutes, and washed. The washing operation is repeated 6 times, and solid-liquid separation is performed by Nutsche suction filtration with No. 5A filter at the time when the pH of filtrate is 7.54 and electric conductivity is 6.5 μS/cm.

The reaction system is then dried by vacuum drying for 12 hours to obtain toner particles 1.

(Toner Particles 2 to 4 and Comparative Toner Particles 1 and 2)

Toner particles 2 to 4 and comparative toner particles 1 and 2 are manufactured in the same manner as in the manufacture of toner particles 1, except for changing the kinds of specific polyester resins to specific polyester resins 2 to 4 and comparative polyester resins 1 and 2.

(Manufacture of Toner 1)

To the above-manufactured toner particles 1, 1.5 parts by mass of hydrophobic silica particles (R972, volume average particle diameter: 16 nm, manufactured by Nippon Aerosil Co., Ltd.) and 1.2 parts by mass of hydrophobic silica particles (R974, volume average particle diameter: 14 nm, manufactured by Nippon Aerosil Co., Ltd.) are added, and mixed with a Henschel mixer to obtain toner 1.

(Manufacture of Toners 2 to 5 and Comparative Toners 1 to 4)

Toners 2 to 5 and comparative toners 1 to 4 are manufactured in the same manner as in the manufacture of toner 1 except for changing the kinds of the toner particles and the kinds and contents of external additives as shown in Table 2.

Example 1

Manufacture of Developer

A developer is manufactured by adding toner 1 to a ferrite carrier having a volume average particle diameter of 50 μM coated with 1% by mass of polymethacrylate (manufactured by Soken Chemical & Engineering Co., Ltd.) so that the toner concentration reaches 5% by mass, and then stirring and mixing the carrier with a ball mill.

<Evaluation>

(Low Temperature Fixing Property)

Each of the developers manufactured as above is mounted on Docu Centre Color 500 (a product of Fuji Xerox Co., Ltd.), and unfixed image is formed on Paper for Coloring (J Paper, a product of Fuji Xerox Co., Ltd.) by adjusting the toner amount to 0.6 mg/cm$^2$. The temperature on J Paper is gradually increased in the range of 90° C. or more and 180° C. or less and fixed image is obtained by fixing the unfixed image using a modified external fixing machine. Unicellophane (width: 18 mm, manufactured by Mitsubishi Pencil Co., Ltd.) is stuck on an image fixed by each fixing temperature, load of 500 g is applied with a roller, and after peeling the tape, the image density is observed.

The fixing temperature giving image density of 1.5 or more is taken as the lowest fixing temperature.

The criteria of the lowest fixing temperature are as follows.

The results obtained are shown in Table 2 below.

A: The lowest fixing temperature is less than 120° C.

B: The lowest fixing temperature is 120° C. or more and 125° C. or less

C: The lowest fixing temperature is 125° C. or more (Liberation Rate of the External Additives)

The liberation rate of the external additive in toner 1 is measured by the above-described method.

The results obtained are shown in Table 2 below.

(Transferability)

The above-manufactured developer is mounted on Docu Centre Color 500 (a product of Fuji Xerox Co., Ltd.), and printed is performed at printing rate of 9%, line speed of 1,000 msec, for 2 hours.

After that, printed is performed at printing rate of 0.15% for 3 hours. After sudden stop, the amount of the toner on the photoconductor and the amount of the toner on the recording medium are measured, and the ratio of these (toner amount on the recording medium/toner amount on the photoconductor) is found as the transfer efficiency, by which transferability is evaluated.

The criteria of evaluation are as follows.

The results obtained are shown in Table 2.

A: Transferability is 80% or more
B: Transferability is 70% or more
C: Transferability is less than 70%

(Image Defects)

The above-manufactured developer is mounted on Docu Centre Color 500 (a product of Fuji Xerox Co., Ltd.), and after image is formed, image defects are visually evaluated.

The results obtained are shown in Table 2 below.

(Carrier Impaction)

Printing is performed for 30 hours with the above-manufactured developer in the same manner as in the evaluation of image defects. After that, carrier impaction (carrier contamination) by the toner and external additives is measured as follows.

(1) The developer is passed through an aperture having a pore size of 20 μm, and the carbon amount of the remaining carrier is measured with a carbon analyzer (manufactured by Horiba Ltd.).

(2) The measured carrier is washed with chloroform to remove the toner attached to the carrier. The value obtained by subtracting the carbon amount measured in (2) from the carbon amount measured in (1) is taken as the amount of the impaction of the toner. The impaction is taken as the mass to the carrier.

The criteria of evaluation are as follows.
The results obtained are shown in Table 2 below.
A: 0.2% by mass or more
B: 0.2% by mass or less (Offset Resisting Property at High Temperature)

Offset resisting property at high temperature is evaluated as follows.

In non-offset region, the surface temperature of the fixing roller is stepwise changed and unfixed paper is passed. After the image or a part of the image is transferred to the fixing roller, whether it is transferred to the succeeding paper or not is visually judged.

The offset region on the high temperature side is found with the one showing transfer to the paper being with offset and the one not showing transfer to the paper being without offset.

The criteria of evaluation are as follows.
Judgment of the offset region on the high temperature side
220° C. or more: A
200° C. or more: B
190° C. or less: C
180° C. or less: D Grade B or upper comes up to the standard.
The results obtained are shown in Table 2.

Examples 2 to 5 and Comparative Examples 1 to 4

Developers are manufactured in the same manner as in Example 1 except for changing the kinds of toner as shown in Table 2, and evaluation is carried out in the same manner as in Example 1.

The results obtained are shown in Table 2.

TABLE 2

| Example No. | Toner | Average Degree of Circularity of Toner | Toner Particle | External Additive Kind/Parts by Mass | Mass Ratio (small particle diameter/large particle diameter) | Degree of Liberation | The Lowest Fixing Temperature (° C.) | Transferability (transfer efficiency) | Image Density | Image Defect | Carrier Impaction | Offset Resisting Property at High Temperature |
|---|---|---|---|---|---|---|---|---|---|---|---|---|
| Example 1 | Toner 1 | 0.95 | Toner particle 1 | R972/1.5 RY50/1.2 | 1.25 | 1.5 | 119 (A) | 85 (A) | 1.9 | Nothing | 0.09 (A) | 220 (A) |
| Example 2 | Toner 2 | 0.96 | Toner particle 2 | R972/2.0 RY50/2.5 | 0.8 | 2.4 | 115 (A) | 89 (A) | 1.8 | Nothing | 0.12 (A) | 220 (A) |
| Example 3 | Toner 3 | 0.97 | Toner particle 3 | R974/1.0 RY50/0.5 | 2 | 0.5 | 120 (A) | 88 (A) | 1.8 | Nothing | 0.10 (A) | 210 (B) |
| Example 4 | Toner 4 | 0.98 | Toner particle 4 | R974/5.0 RY50/0.5 | 10 | 1.4 | 118 (A) | 75 (B) | 1.7 | Nothing | 0.11 (A) | 200 (B) |
| Example 5 | Toner 5 | 0.99 | Toner particle 4 | R974/2.5 RY50/1.5 | 1.6 | 8.9 | 124 (A) | 76 (B) | 1.7 | Nothing | 0.15 (A) | 220 (A) |
| Comparative Example 1 | Comparative toner 1 | 0.94 | Comparative toner particle 1 | R972/2.4 RY50/0.1 | 12 | 10.5 | 138 (C) | 69 (B) | 1.3 | Blank area | 0.23 (B) | 190 (C) |
| Comparative Example 2 | Comparative toner 2 | 0.94 | Comparative toner particle 2 | R972/0.5 RY50/5.5 | 0.09 | 11.2 | 145 (C) | 68 (C) | 1.2 | Blank area | 0.34 (B) | 190 (C) |
| Comparative | Comparative | 0.95 | Toner particle 1 | R976/1.2 | — | 12 | 136 (C) | 57 (C) | 1.4 | Blank area | 0.35 (B) | 180 (D) |

TABLE 2-continued

| Example No. | Toner | Average Degree of Circularity of Toner | Toner Particle | External Additive Kind/Parts by Mass | Mass Ratio (small particle diameter/large particle diameter) | Degree of Liberation | The Lowest Fixing Temperature (° C.) | Transferability (transfer efficiency) | Image Density | Image Defect | Carrier Impaction | Offset Resisting Property at High Temperature |
|---|---|---|---|---|---|---|---|---|---|---|---|---|
| Example 3 Comparative Example 4 | toner 3 Comparative toner 4 | 0.94 | Toner particle 1 | R976/1.0 | — | 13 | 140 (C) | 55 (C) | 1.6 | Blank area | 0.26 (B) | 190 (C) |

Note)
R972: Hydrophobic silica having an average particle diameter of 16 nm, manufactured by Nippon Aerosil Co., Ltd.
R974: Hydrophobic silica having an average particle diameter of 14 nm, manufactured by Nippon Aerosil Co., Ltd.
R976: Hydrophobic silica having an average particle diameter of 7 nm, manufactured by Nippon Aerosil Co., Ltd.
RY50: Hydrophobic silica having an average particle diameter of 50 nm, manufactured by Nippon Aerosil Co., Ltd.

From the above results, it is apparent that liberation of the external additives are restrained, lowering of the transfer property, lowering of image density, occurrence of image defects and occurrence of carrier impaction ascribable to liberation of the external additives are restrained, and the low temperature fixing property and offset resisting property at a high temperature are maintained in the Examples as compared with the Comparative examples.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. An electrostatic image developing toner comprising:
toner particles containing a polyester resin having a repeating unit derived from a dicarboxylic acid and a repeating unit derived from a rosin diol represented by the following Formula (1):

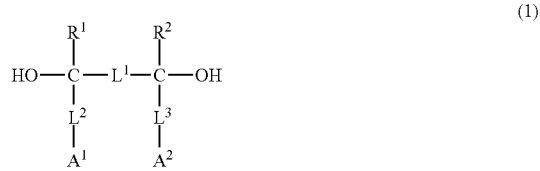

where in the Formula (1),
each of $R^1$ and $R^2$ independently represents a hydrogen atom or a methyl group;
each of $L^1$, $L^2$ and $L^3$ independently represents a divalent linking group selected from the group consisting of carbonyl groups, ester groups, ether groups, sulfonyl groups, chained alkylene groups which may be substituted or unsubstituted, cyclic alkylene groups which may be substituted or unsubstituted, arylene groups which may be substituted or unsubstituted, and combinations thereof, and $L^1$ and $L^2$ or $L^1$ and $L^3$ may form a ring; and
each of $A^1$ and $A^2$ independently represents a rosin ester group, and
an external additive containing silica particles,
wherein a weight average molecular weight (Mw) of a soluble matter in tetrahydrofuran of the toner is from about 60,000 to about 200,000.

2. The electrostatic image developing toner according to claim 1, wherein a number average molecular weight (Mn) of a soluble matter in tetrahydrofuran of the toner is from about 3,000 to about 20,000, and a ratio of the weight average molecular weight (Mw) to the number average molecular weight (Mn) (Mw/Mn) is from about 5 to about 20.

3. An electrostatic image developer comprising the electrostatic image developing toner according to claim 1.

4. A toner cartridge containing the electrostatic image developing toner according to claim 1, wherein the cartridge is attachable to and detachable from an image forming apparatus.

5. A process cartridge comprising a developing unit that contains the electrostatic image developer according to claim 3 and forms a toner image by developing an electrostatic image formed on a surface of an image holding member with the electrostatic image developer, wherein the cartridge is attachable to and detachable from an image forming apparatus.

6. An image forming apparatus comprising:
an image holding member,
a charging unit that charges the surface of the image holding member,
an electrostatic image forming unit that forms an electrostatic image on a surface of the image holding member,
a developing unit that contains the electrostatic image developer according to claim 3 and forms a toner image by developing the electrostatic image with the electrostatic image developer,
a transfer unit that transfers the toner image onto a recording medium, and
a fixing unit that fixes the toner image on the recording medium.

7. The image forming apparatus according to claim 6, wherein the transfer unit comprises:
an intermediate transfer unit to which the toner image formed on the surface of the image holding member is transferred,
a first transfer unit that transfers the toner image formed on the surface of the image holding member to the intermediate transfer member, and
a second transfer unit that transfers the toner image on the intermediate transfer member to the recording medium.

8. An image forming method comprising:
charging a surface of an image holding member,
forming an electrostatic image on the surface of the image holding member, developing the electrostatic image with the electrostatic image developer according to claim 3 to form a toner image, transferring the toner image onto a recording medium, and fixing the toner image on the recording medium.

9. The image forming method as claimed in claim 8, wherein the transferring of the toner image onto the recording medium comprises:

first transferring the toner image developed on the surface of the image holding member to an intermediate transfer member, and next transferring the toner image on the intermediate transfer member to the recording medium.

\* \* \* \* \*